United States Patent
Mizutani

(10) Patent No.: US 11,046,305 B2
(45) Date of Patent: Jun. 29, 2021

(54) LEANING POSTURE CONTROL DEVICE FOR LEANING VEHICLE HAVING LEFT AND RIGHT INCLINED WHEELS MOUNTED THEREON AND LEANING VEHICLE HAVING LEFT AND RIGHT INCLINED WHEELS MOUNTED THEREON

(71) Applicant: YAMAHA HATSUDOKI KABUSHIKI KAISHA, Iwata (JP)

(72) Inventor: Takaaki Mizutani, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 203 days.

(21) Appl. No.: 16/138,345

(22) Filed: Sep. 21, 2018

(65) Prior Publication Data

US 2019/0023264 A1    Jan. 24, 2019

Related U.S. Application Data

(63) Continuation-in-part of application No. PCT/JP2017/011862, filed on Mar. 23, 2017.

(30) Foreign Application Priority Data

Mar. 23, 2016    (JP) .............................. JP2016-058772

(51) Int. Cl.
*B60W 30/045*    (2012.01)
*B60T 8/172*    (2006.01)
(Continued)

(52) U.S. Cl.
CPC ............ *B60W 30/045* (2013.01); *B60T 8/172* (2013.01); *B60T 8/1706* (2013.01); *B60T 8/1755* (2013.01);
(Continued)

(58) Field of Classification Search
CPC .. B60W 30/045; B60W 10/04; B60W 10/184; B60W 30/04; B60W 2300/367;
(Continued)

(56) References Cited

U.S. PATENT DOCUMENTS 7,143,853 B1 * 12/2006 Mercier ................ B60T 8/1706
                                                              180/210
8,123,240 B2    2/2012 Mercier
(Continued)

FOREIGN PATENT DOCUMENTS

EP              2930073 A1    10/2015
JP          2002002461 A       1/2002
(Continued)

*Primary Examiner* — Sze-Hon Kong
(74) *Attorney, Agent, or Firm* — Rabin & Berdo, P.C.

(57) ABSTRACT

A leaning posture control device controls a leaning posture of a left-right-inclined-wheel-equipped leaning vehicle. The leaning posture control device controls a torque of at least one of a left inclined wheel or a right inclined wheel arranged in a left-right direction of the vehicle so as to suppress a change in a lean of the lean body frame in a left direction or right direction of the vehicle while the lean body frame is leaned, based on a physical quantity concerning side-slip, in the left direction of the vehicle or in the right direction of the vehicle, of the left inclined wheel, the right inclined wheel, and another inclined wheel disposed ahead of or behind the left inclined wheel and the right inclined wheel.

9 Claims, 18 Drawing Sheets

(51) Int. Cl.
  *B62K 5/10* (2013.01)
  *B62K 5/027* (2013.01)
  *B60T 8/1755* (2006.01)
  *B60W 30/04* (2006.01)
  *B60T 8/17* (2006.01)
  *B60T 8/32* (2006.01)
  *B60W 10/04* (2006.01)
  *B60W 10/184* (2012.01)

(52) U.S. Cl.
  CPC ........... *B60T 8/3225* (2013.01); *B60W 10/04* (2013.01); *B60W 10/184* (2013.01); *B60W 30/04* (2013.01); *B62K 5/027* (2013.01); *B62K 5/10* (2013.01); *B60W 2300/367* (2013.01); *B60W 2520/06* (2013.01); *B60W 2520/10* (2013.01); *B60W 2520/12* (2013.01); *B60W 2520/18* (2013.01); *B60W 2520/20* (2013.01); *B60W 2520/26* (2013.01)

(58) Field of Classification Search
  CPC ......... B60W 2520/06; B60W 2520/10; B60W 2520/12; B60W 2520/18; B60W 2520/20; B60W 2520/26; B60T 8/1706; B60T 8/172; B60T 8/155; B60T 8/3225; B60T 8/1755; B62K 5/027; B62K 5/10
  See application file for complete search history.

(56) References Cited

U.S. PATENT DOCUMENTS

| | | | | |
|---|---|---|---|---|
| 8,141,890 B2* | 3/2012 | Hughes | ............... | B62K 5/027 |
| | | | | 280/124.103 |
| 9,346,510 B2 | 5/2016 | Watanabe et al. | | |
| 2006/0180372 A1* | 8/2006 | Mercier | ............... | B60T 8/1706 |
| | | | | 180/210 |
| 2006/0255550 A1* | 11/2006 | Pfeil | ............... | B62K 5/05 |
| | | | | 280/5.509 |
| 2007/0075517 A1* | 4/2007 | Suhre | ............... | B60G 21/007 |
| | | | | 280/124.134 |
| 2007/0075582 A1* | 4/2007 | Nakayama | ............ | B60T 8/1706 |
| | | | | 303/146 |
| 2007/0262656 A1* | 11/2007 | Fulks | ............... | B60G 21/007 |
| | | | | 307/143 |
| 2007/0265746 A1* | 11/2007 | Fulks | ............... | B60T 8/1755 |
| | | | | 701/36 |
| 2009/0152940 A1* | 6/2009 | Mercier | ............. | B60T 8/17554 |
| | | | | 303/113.2 |
| 2011/0006498 A1* | 1/2011 | Mercier | ............. | B62K 5/10 |
| | | | | 280/124.103 |
| 2012/0232758 A1* | 9/2012 | Mercier | ............. | B60G 17/0162 |
| | | | | 701/41 |
| 2013/0168944 A1* | 7/2013 | Bartolozzi | ............ | B62K 5/01 |
| | | | | 280/269 |
| 2015/0165855 A1* | 6/2015 | Yu | ............... | B60G 17/00 |
| | | | | 280/5.508 |
| 2015/0274160 A1* | 10/2015 | Lee | ............... | B60W 10/20 |
| | | | | 701/41 |
| 2016/0144680 A1* | 5/2016 | Simon | ............. | B62D 9/04 |
| | | | | 280/124.103 |
| 2016/0229246 A1* | 8/2016 | Mori | ............. | B62K 5/027 |
| 2016/0229251 A1* | 8/2016 | Mori | ............. | B62K 5/08 |
| 2016/0244094 A1* | 8/2016 | Spahl | ............. | B60G 17/00 |
| 2016/0280193 A1 | 9/2016 | Seto et al. | | |
| 2016/0280307 A1* | 9/2016 | Takenaka | ............. | B62K 5/10 |
| 2016/0375948 A1* | 12/2016 | Takenaka | ............. | B60K 11/00 |
| | | | | 280/5.506 |
| 2017/0008591 A1* | 1/2017 | Abbott | ............. | B62K 5/05 |
| 2017/0050693 A1* | 2/2017 | Matties | ............. | B62K 5/027 |
| 2017/0291637 A1* | 10/2017 | Horiguchi | ............. | B62K 5/08 |
| 2018/0257731 A1* | 9/2018 | Kanehara | ............. | B60G 21/05 |

FOREIGN PATENT DOCUMENTS

| | | |
|---|---|---|
| JP | 2011126514 A | 10/2011 |
| JP | 2011195100 A | 10/2011 |
| JP | 2012-051460 A | 3/2012 |
| JP | 5580937 B2 | 8/2014 |
| JP | 2016-035473 A | 3/2016 |
| WO | 2012057040 A1 | 5/2012 |
| WO | WO-2015/064656 A1 | 5/2015 |

* cited by examiner

LEANING POSTURE CONTROL DEVICE FOR LEANING VEHICLE HAVING LEFT AND RIGHT INCLINED WHEELS MOUNTED THEREON AND LEANING VEHICLE HAVING LEFT AND RIGHT INCLINED WHEELS MOUNTED THEREON

CROSS-REFERENCES TO RELATED APPLICATIONS

The present application is a continuation-in-part application of International Application No. PCT/JP2017/011862, filed on Mar. 23, 2017, and having the benefit of the earlier filing date of Japanese Application No. 2016-058772, filed Mar. 23, 2016. The content of each of the identified applications is incorporated herein by reference in its entirety.

BACKGROUND

Technical Field

The present teaching relates to a leaning posture control device for controlling a posture of a leaning vehicle having left and right inclined wheels mounted thereon (hereinafter referred to as a "left-right-inclined-wheel-equipped leaning vehicle") that includes a front wheel and a rear wheel, one of which includes a left wheel and a right wheel, and that turns while being leaned in the turning direction, and also relates to a left-right-inclined-wheel-equipped leaning vehicle on which the leaning posture control device is mounted.

Background Art

Japanese Patent No. 5580937 (Patent Document 1) discloses a posture control device of a motorcycle including a longitudinal force control section that reduces an absolute value of a longitudinal force of each wheel based on a lateral acceleration and a bank angle. A lateral acceleration is an acceleration in a left direction or in a right direction exerted on a vehicle. A longitudinal force is the sum of forces in a forward direction of the vehicle and a rearward direction of the vehicle exerted on each wheel. The longitudinal force control section acquires a side-slip acceleration of each wheel based on the lateral acceleration and the bank angle, and if the absolute value of the side-slip acceleration exceeds a threshold, reduces the absolute value of a longitudinal force of each wheel.

In addition, U.S. Pat. No. 8,123,240 (Patent Document 2) discloses a left-right-inclined-wheel-equipped leaning vehicle including a body frame that can lean in the left direction of the vehicle or in the right direction of the vehicle, and a right front wheel and a left front wheel supported on the body frame. This left-right-inclined-wheel-equipped leaning vehicle includes a lean actuator for controlling the frame to an upright position.

CITATION LIST

Patent Document

Patent Document 1: Japanese Patent No. 5580937
Patent Document 2: U.S. Pat. No. 8,123,240

SUMMARY OF INVENTION

The present teaching has an object of providing a leaning posture control device for controlling a leaning posture of a left-right-inclined-wheel-equipped leaning vehicle by a means different from a lean actuator, and a left-right-inclined-wheel-equipped leaning vehicle.

An inventor of the present teaching studied to reduce a longitudinal force of each wheel while the left-right-wheel-equipped leaning vehicle is turning with a body frame leaning in the left direction of the vehicle or in the right direction of the vehicle. While the left-right-wheel-equipped leaning vehicle is travelling on a curve, when a resultant force of longitudinal forces of the wheels and a cornering force in the left direction of the vehicle or in the right direction of the vehicle exceeds a maximum allowable level of grip forces of the wheels, the wheels slip. Thus, the allowable level of the cornering force can be increased by reducing the longitudinal forces.

The inventor further studied a configuration of the left-right-wheel-equipped leaning vehicle and a behavior during turning. The left-right-wheel-equipped leaning vehicle includes a lean body frame, a right inclined wheel, a left inclined wheel, and another inclined wheel supported by the lean body frame. The lean body frame leans leftward when the vehicle turns leftward, and leans rightward when the vehicle turns rightward. The right inclined wheel, the left inclined wheel, and the other inclined wheel also lean leftward when the vehicle turns leftward, and lean rightward when the vehicle turns rightward. The right inclined wheel and the left inclined wheel are arranged along a left-right direction (lateral direction) of the vehicle. The other inclined wheel is disposed ahead of or behind the right inclined wheel and the left inclined wheel.

Through the study, the inventor found that the use of geometrical arrangement of the right inclined wheel, the left inclined wheel, and the other inclined wheel enables a lean of the lean body frame in the left direction or in the right direction to be affected not only by reducing the absolute value of a longitudinal force in the left-right-wheel-equipped leaning vehicle but also by increasing the absolute value. Through further study, the inventor arrived at a configuration in which a force of leaning the lean body frame in the left direction or in the right direction is generated by controlling a torque of at least one of the right inclined wheel or the left inclined wheel while the lean body frame leans, with the use of a physical quantity concerning side-slip of the right inclined wheel, the left inclined wheel, and the other inclined wheel in the left direction or in the right direction. Specifically, the inventor arrived at a configuration in which a torque of at least one of the right inclined wheel or the left inclined wheel is controlled so as to reduce a change in a lean of the lean body frame in the left direction while the lean body frame leans in the left direction or a change in a lean of the lean body frame in the right direction while the lean body frame leans in the right direction, based on a physical quantity concerning side-slip of the right inclined wheel, the left inclined wheel, and the other inclined wheel in the left direction or in the right direction. Based on this finding, the inventor arrived at the following configurations.

(First Configuration)

A first configuration according to one aspect of the present teaching relates to a leaning posture control device for a left-right-inclined-wheel-equipped leaning vehicle configured to control a leaning posture of the left-right-inclined-wheel-equipped leaning vehicle. The left-right-inclined-wheel-equipped leaning vehicle includes: a lean body frame that leans leftward when the vehicle is turning leftward in a left-right direction of the vehicle, and leans rightward when the vehicle is turning rightward in the left-right direction of the vehicle; a right inclined wheel supported on the lean body frame, the right inclined wheel being leaned leftward when the vehicle is turning leftward in the left-right direction of the vehicle and being leaned rightward when the vehicle is turning rightward in the left-right direction of the vehicle; a left inclined wheel supported on the lean body frame and disposed at a side of the right inclined wheel in the left-right direction of the vehicle, the left inclined wheel being leaned leftward when the vehicle is turning leftward in the left-right direction of the vehicle and being leaned rightward when the vehicle is turning rightward in the left-right direction of the vehicle; and another inclined wheel supported on the lean body frame and disposed ahead of or behind the right inclined wheel and the left inclined wheel in a front-rear direction of the vehicle, the other inclined wheel being leaned leftward when the vehicle is turning leftward in the left-right direction of the vehicle and being leaned rightward when the vehicle is turning rightward in the left-right direction of the vehicle. The leaning posture control device controls a torque of at least one of the right inclined wheel or the left inclined wheel arranged in the left-right direction of the vehicle so as to suppress a change in a lean of the lean body frame in a left direction of the vehicle while the lean body frame is leaned in the left direction or a change in a lean of the lean body frame in a right direction of the vehicle while the lean body frame is leaned in the right direction, based on a physical quantity concerning side-slip, in the left direction of the vehicle or in the right direction of the vehicle, of the right inclined wheel, the left inclined wheel, and the other inclined wheel disposed ahead of or behind the right inclined wheel and the left inclined wheel in the front-rear direction of the vehicle.

With the first configuration, the leaning posture control device suppresses a change in a lean of the lean body frame in the left direction or in the right direction by controlling at least one of the right inclined wheel or the left inclined wheel based on a physical quantity concerning side-slip of the right inclined wheel and the left inclined wheel that are arranged along the left-right direction and the other inclined wheel disposed ahead of or behind the right inclined wheel and the left inclined wheel. Accordingly, longitudinal forces of the right inclined wheel and the left inclined wheel are controlled by using geometrical arrangement of the right inclined wheel, the left inclined wheel, and the other inclined wheel so that a lean of the lean body frame in the left direction or in the right direction can be controlled. As a result, a posture of the left-right-wheel-equipped leaning vehicle can be controlled by using a means different from a lean actuator.

(Second Configuration)

In the first configuration, the leaning posture control device may control a torque of at least one of the right inclined wheel or the left inclined wheel so as to suppress the change in the lean of the lean body frame in the left direction while the lean body frame is leaned in the left direction or the change in the lean body frame in the right direction of the vehicle while the lean body frame is leaned in the right direction, based on the physical quantity concerning side-slip of the right inclined wheel, the left inclined wheel, and the other inclined wheel.

(Third Configuration)

In the first or second configuration, the physical quantity concerning side-slip of the right inclined wheel, the left inclined wheel, and the other inclined wheel may be a physical quantity concerning displacement of a ground-contact point of each of the right inclined wheel, the left inclined wheel, and the other inclined wheel in the left direction of the vehicle or in the right direction of the vehicle.

(Fourth Configuration)

In the third configuration, the physical quantity concerning displacement of the ground-contact point of each of the right inclined wheel, the left inclined wheel, and the other inclined wheel in the left direction or in the right direction may be a displacement, a speed, an acceleration, an angular velocity, an angular acceleration, or a value expressed by using at least two of the displacement, the speed, the acceleration, the angular velocity, and the angular acceleration.

(Fifth Configuration)

A fifth configuration is a configuration of the left-right-inclined-wheel-equipped leaning vehicle including the leaning posture control device having one of the first through fourth configurations. In the left-right-inclined-wheel-equipped leaning vehicle having the fifth configuration, the left inclined wheel and the right inclined wheel are front wheels, and the other inclined wheel is a rear wheel. In this case, the leaning posture control device can make a braking torque of one of the left inclined wheel and the right inclined wheel at an outer side of turning larger than a braking torque of one of the left inclined wheel and the right inclined wheel at an inner side of turning in a case where the lean body frame is leaned in the left direction or in the right direction and side-slip occurs in the other inclined wheel while the vehicle is turning. The leaning posture control device can also make the braking torque of the one of the left inclined wheel and the right inclined wheel at the outer side of turning smaller than the braking torque of the one of the left inclined wheel and the right inclined wheel at the inner side of turning in a case where the lean body frame is leaned in the left direction or in the right direction and side-slip occurs in the left inclined wheel and the right inclined wheel while the vehicle is turning.

In a case where the left inclined wheel and the right inclined wheel are front wheels and the other inclined wheel is a rear wheel, the leaning posture control device may have the following configuration. In a case where the other inclined wheel slips sideways while the vehicle is turning with the lean body frame leaned in the left direction or in the right direction, the leaning posture control device can make a driving torque of one of the left inclined wheel and the right inclined wheel at the outer side in turning smaller than a driving torque of the wheel at the inner side of turning. In addition, in a case where the left inclined wheel and the right inclined wheel slip sideways while the vehicle is turning with the lean body frame leaned in the left direction or in the right direction, the leaning posture control device can make a driving torque of one of the left inclined wheel and the right inclined wheel at the outer side of turning larger than a driving torque of the wheel at the inner side of turning.

(Sixth Configuration)

A sixth configuration is a configuration of the left-right-inclined-wheel-equipped leaning vehicle including the leaning posture control device having one of the first through fourth configurations. In the left-right-inclined-wheel-equipped leaning vehicle having the sixth configuration, the left inclined wheel and the right inclined wheel are rear wheels, and the other inclined wheel is a front wheel. In this case, the leaning posture control device can make a braking torque of one of the left inclined wheel and the right inclined wheel at an outer side of turning smaller than a braking torque of one of the left inclined wheel and the right inclined wheel at an inner side of turning in a case where the lean body frame is leaned in the left direction or in the right direction and side-slip occurs in the other inclined wheel while the vehicle is turning. In addition, the leaning posture control device can also make the braking torque of the one of the left inclined wheel and the right inclined wheel at the outer side of turning larger than the braking torque of the one of the left inclined wheel and the right inclined wheel at the inner side of turning in a case where the lean body frame is leaned in the left direction or in the right direction and side-slip occurs in the left inclined wheel and the right inclined wheel while the vehicle is turning.

In a case where the left inclined wheel and the right inclined wheel are rear wheels and the other inclined wheel is a front wheel, the leaning posture control device may take the following configuration. In a case where the other inclined wheel slips sideways while the vehicle is turning with the lean body frame leaned in the left direction or in the right direction, the leaning posture control device can make a driving torque of one of the left inclined wheel and the right inclined wheel at the outer side of turning larger than a driving torque of the wheel at the inner side of turning. In addition, in a case where the left inclined wheel and the right inclined wheel slip sideways while the vehicle is turning with the lean body frame leaned in the left direction or in the right direction, the leaning posture control device can make a driving torque of one of the left inclined wheel and the right inclined wheel at the outer side of turning smaller than a driving torque of the wheel at the inner side of turning.

Advantageous Effects of Invention

According to the present teaching, a leaning posture of a left-right-inclined-wheel-equipped leaning vehicle can be controlled by a means different from a lean actuator.

DETAILED DESCRIPTION

In this specification, a "yaw angle" refers to a rotation angle of a body frame around an axis in the top-bottom direction (vertical direction) of a vehicle. A "yaw angular velocity" refers to a rate of change in the "yaw angle." A "roll angle" refers to a rotation angle of the body frame around an axis in the front-rear direction (longitudinal direction) of the vehicle. A "roll angular velocity" refers to a rate of change in the "roll angle." A lean angle of the body frame in the left direction of the vehicle or in the right direction of the vehicle can be expressed using the roll angle. A "pitch angle" refers to a rotation angle of the body frame around the axis in the left-right direction of the vehicle. A "pitch angular velocity" refers to a rate of change in the "pitch angle."

Figure 15:
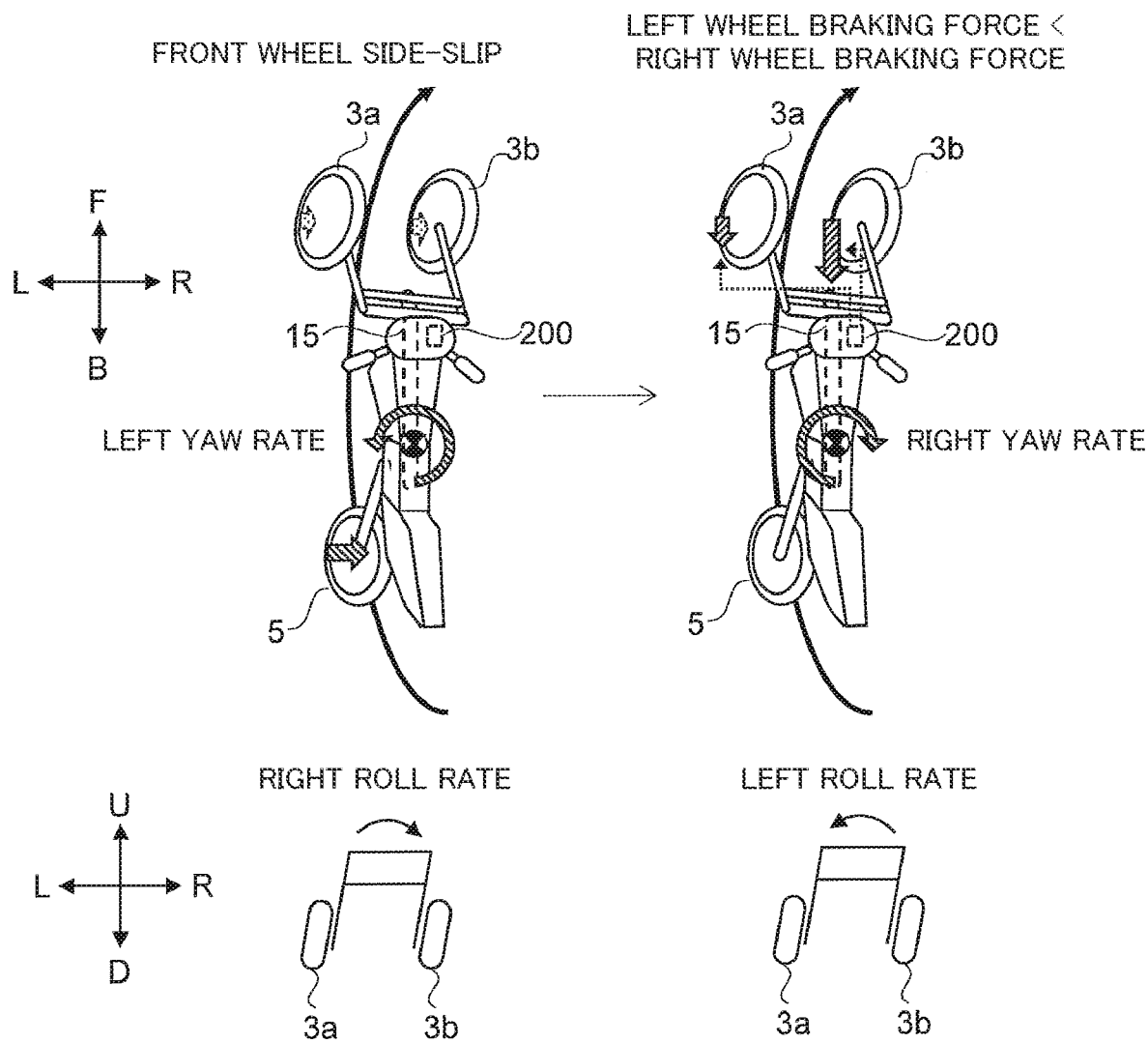
FIG. 15 shows illustrations for describing an example of motion of a vehicle in an embodiment.

First, with reference to FIG. 15, a left-right-inclined-wheel-equipped leaning vehicle according to an embodiment of the present teaching will be briefly described. The left-right-wheel-equipped leaning vehicle includes a lean body frame 15, and also includes a left inclined wheel 3a, a right inclined wheel 3b, and another inclined wheel 5 supported on the lean body frame 15. The lean body frame 15 leans leftward when the left-right-wheel-equipped leaning vehicle turns leftward in the left-right direction of the vehicle, and leans rightward when the left-right-wheel-equipped leaning vehicle turns rightward in the left-right direction of the vehicle. The left inclined wheel 3a and the right inclined wheel 3b are arranged in the left-right direction of the vehicle. The other inclined wheel 5 is disposed ahead of or behind the left inclined wheel 3a and the right inclined wheel 3b in the front-rear direction of the vehicle. The left inclined wheel 3a, the right inclined wheel 3b, and the other inclined wheel 5 lean leftward when the left-right-wheel-equipped leaning vehicle turns leftward in the left-right direction of the vehicle, and lean rightward when the left-right-wheel-equipped leaning vehicle turns rightward in the left-right direction of the vehicle.

The left-right-inclined-wheel-equipped leaning vehicle includes a leaning posture control device 200 for controlling a leaning posture of the left-right-inclined-wheel-equipped leaning vehicle. The leaning posture control device 200 controls a torque of at least one of the left inclined wheel 3a or the right inclined wheel 3b arranged in the left-right direction of the vehicle so as to suppress a change in a lean of the lean body frame 15 in the left direction while the lean body frame 15 is leaned in the left direction or a change in a lean of the lean body frame 15 in the right direction while the lean body frame 15 is leaned in the right direction, based on physical quantities concerning side-slip of the left inclined wheel 3a, the right inclined wheel 3b, and the other inclined wheel 5 disposed ahead of or behind the left inclined wheel 3a and the right inclined wheel 3b.

For example, as illustrated in FIG. 15, in a case where the left inclined wheel 3a and the right inclined wheel 3b slip sideways while the vehicle is turning with the lean body frame 15 leaned in the left direction or in the right direction, the leaning posture control device 200 makes a braking torque of one of the left inclined wheel 3a and the right inclined wheel 3b at the outer side of turning smaller than a braking torque of the wheel at the inner side of turning. Alternatively, in this case, the leaning posture control device 200 may make the driving torque of the one of the left inclined wheel 3a and the right inclined wheel 3b at the outer side of turning larger than the driving torque of the wheel at the inner side of turning.

In the example illustrated in FIG. 15, the side-slip of the left inclined wheel 3a and the right inclined wheel 3b increases the radius of turning so that a centrifugal force decreases. Accordingly, a force of leaning the lean body frame 15 to the inner side of turning, that is, rightward, is generated. On the other hand, the leaning posture control device 200 makes longitudinal forces of the left inclined wheel 3a and the right inclined wheel 3b different from each other so that a force of leaning the lean body frame 15 to the outer side of turning, that is, leftward, is generated. Consequently, a change in a lean of the lean body frame 15 in the left direction or in the right direction is suppressed.

Figure 16:
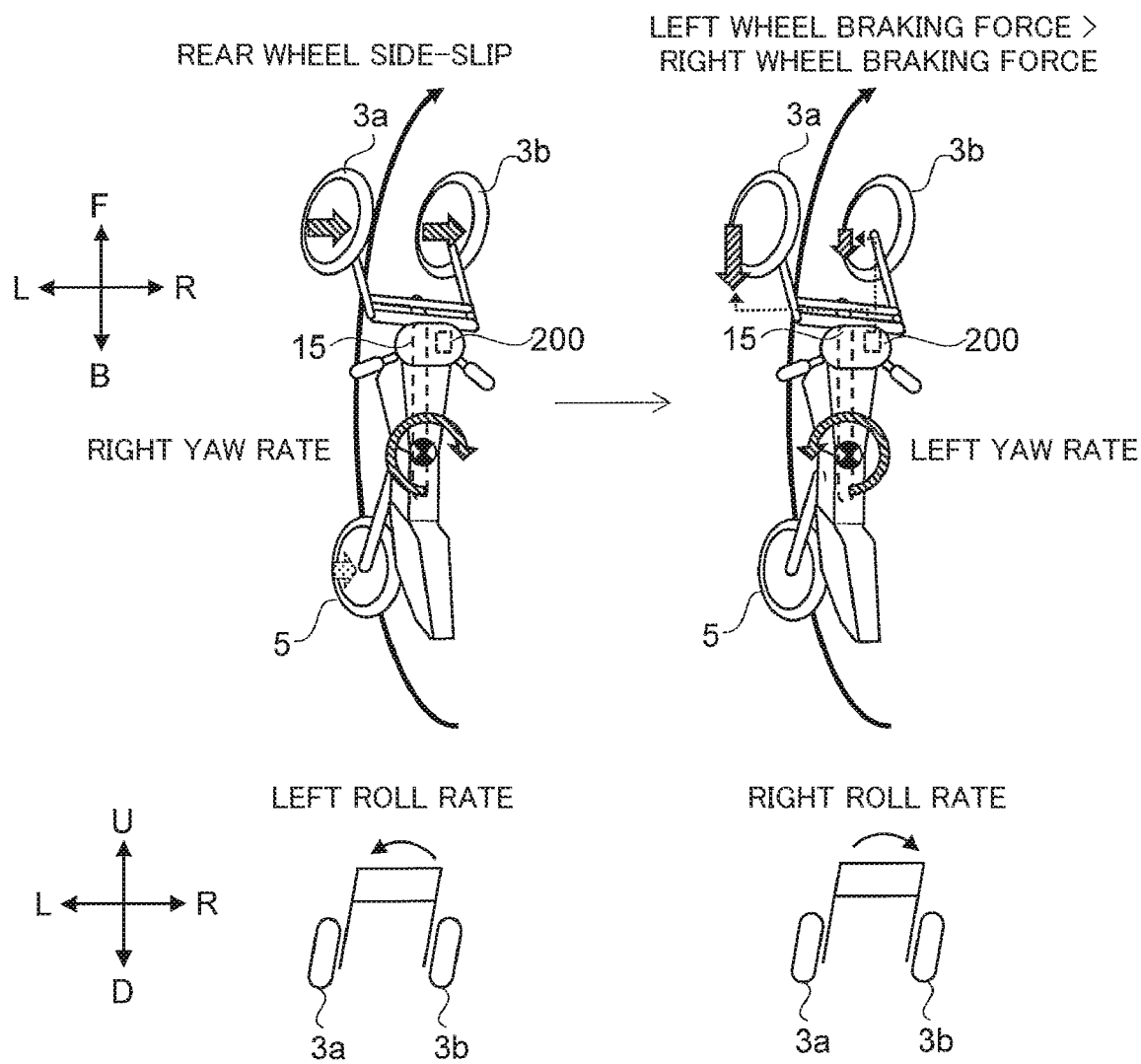
FIG. 16 shows illustrations for describing an example of motion of the vehicle in the embodiment.

Alternatively, as illustrated in FIG. 16, in a case where the other inclined wheel 5 slips sideways while the vehicle is turning with the lean body frame 15 leaned in the left direction or in the right direction, the leaning posture control device 200 makes the braking torque of the one of the left inclined wheel 3a and the right inclined wheel 3b at the outer side of turning larger than the braking torque of the wheel at the inner side of turning. Alternatively, in this case, the leaning posture control device 200 may make the driving torque of the one of the left inclined wheel 3a and the right inclined wheel 3b at the outer side of turning smaller than the driving torque of the wheel at the inner side of turning.

In the example illustrated in FIG. 16, the side-slip of the other inclined wheel 5 reduces the radius of turning so that a centrifugal force increases. Accordingly, a force of leaning the lean body frame 15 to the outer side of turning, that is, leftward, is generated. On the other hand, the leaning posture control device 200 makes longitudinal forces of the left inclined wheel 3a and the right inclined wheel 3b different from each other so that a force of leaning the lean body frame 15 to the inner side of turning, that is, rightward, is generated. Consequently, a change in a lean of the lean body frame 15 in the left direction or in the right direction is suppressed.

An embodiment of the present teaching will be further described. In the following description, the left-right-inclined-wheel-equipped leaning vehicle will be referred to as a vehicle or a leaning vehicle. The leaning posture control device will be referred to as a posture control device. The lean body frame will be referred to as a body frame.

(First Configuration)

A posture control device with a first configuration of an embodiment of the present teaching is a posture control device for controlling a posture of a straddled vehicle that turns with a lean, the straddled vehicle including a front wheel and a rear wheel one of which includes left and right wheels, and the posture control device includes:

a target yaw moment deviation amount calculating section that calculates a target yaw moment deviation amount based on a side-slip acceleration of each wheel, a length from the vehicle center to a front wheel shaft, a length from the vehicle center to a rear wheel shaft, and a load on each wheel;

a determination section that determines whether the target yaw moment deviation amount calculated by the target yaw moment deviation amount calculating section is less than or equal to a threshold or not; and a torque control section that controls a torque in each wheel based on a longitudinal force of each wheel and a lateral force of each wheel in such a manner that the target yaw moment deviation amount is less than or equal to the threshold, if the determination section determines that the target yaw moment deviation amount is not less than or equal to the threshold.

In a case where the front wheels include left and right wheels, "each wheel" in the first configuration refers to the front left wheel, the front right wheel, and a rear wheel. In this case, the front left wheel is an example of a left inclined wheel, the front right wheel is an example of a right inclined wheel, and the rear wheel is an example of another inclined wheel. In a case where the rear wheel includes left and right wheels, "each wheel" refers to the front wheel, the rear left wheel, and the rear right wheel. In this case, the rear left wheel is an example of the left inclined wheel, the rear right wheel is an example of the right inclined wheel, and the front wheel is an example of the other inclined wheel. The torque control section controls at least one of a braking force or a driving force of each wheel, as a torque of each wheel.

In the first configuration, the "longitudinal force" may be calculated by conversion from a brake fluid pressure. The "lateral force" may be calculated by conversion from a vehicle body roll angle (θ). During anti-lock control, a longitudinal force may be calculated by conversion from a brake fluid pressure when a slip ratio is changed, and the slip ratio. During anti-lock control, a lateral force may be calculated by conversion from a vehicle body roll angle and a slip ratio.

(Second Configuration)

In the first configuration, the posture control device may include:

a longitudinal force calculating section and a lateral force calculating section that calculate a longitudinal force estimated value in each wheel and a lateral force estimated value in each wheel, respectively, in a case where a braking force or a driving force in each wheel is changed if the determination section determines that the target yaw moment deviation amount is not less than or equal to the threshold;

a yaw moment change rate calculating section that calculates a yaw moment change rate around a vehicle center axis, based on the longitudinal force estimated value in each wheel and the lateral force estimated value in each wheel respectively calculated by the longitudinal force calculating section and the lateral force calculating section, a wheel base, and a tread width;

a deviation determination section that determines whether each of the target yaw moment deviation amount calculated by the target yaw moment deviation amount calculating section and the yaw moment change rate calculated by the yaw moment change rate calculating section is less than or equal to a predetermined value or not; and a torque calculating section that calculates a torque (a braking force or a driving force) of each wheel that can obtain the yaw moment change rate if the deviation determination section determines that the deviation is less than or equal to the predetermined value. In this case, the torque control section may control a torque of each wheel based on the torque of each wheel calculated by the torque calculating section (second configuration). The longitudinal force calculating section and the lateral force calculating section can use, for example, a brake fluid pressure as a braking force in each wheel. As the torque in each wheel, the torque control section can use at least one of a driving force or a braking force, for example.

The foregoing configuration can control a driving force and/or a braking force of each wheel in such a manner that a yaw moment deviation amount is less than or equal to a predetermined value. For example, torque control is performed on each wheel by using geometrical arrangement of the front left and right wheels and the rear wheel (or the front wheel and the rear left and right wheels) so that the posture of the vehicle can be controlled. For example, a posture of a vehicle whose front left and right wheels are traveling on road surfaces having different friction coefficients (including straight-ahead traveling and curve traveling) can be controlled. In addition, a posture of the vehicle that is turning with a lean during actuation of an ABS (in a state with a small lateral force) can be controlled.

(Third Configuration)

In the second configuration, if the deviation determination section determines that the deviation is not less than or equal to the predetermined value, processes of the longitudinal force calculating section, the lateral force calculating section, the yaw moment change rate calculating section, and the deviation determination section may be repeated. Accordingly, an optimum solution search loop may be executed (Third Configuration).

(Fourth Configuration)

In the second or third configuration, the longitudinal force calculating section may calculate the longitudinal force estimated value by conversion from a changed brake fluid pressure or a changed engine torque. The lateral force calculating section may calculate the lateral force estimated value by conversion from a vehicle body roll angle (θ) (fourth configuration).

(Fifth Configuration)

In any one of the second through fourth configurations, the longitudinal force calculating section may calculate the longitudinal force estimated value by conversion from a brake fluid pressure and a slip ratio in changing the slip ratio during anti-lock control. The lateral force calculating section may calculate the lateral force estimated value by conversion from a vehicle body roll angle and the slip ratio during anti-lock control. An anti-lock operation of each of the front wheel and the rear wheel may be corrected using the longitudinal force estimated value and the lateral force estimated value (Fifth Configuration).

(Sixth Configuration)

In any one of the first through fifth configurations, the posture control device may further include a suppression section that suppresses a vehicle body roll behavior, that is, a tilt motion, occurring when the torque control section controls a torque in each wheel (sixth configuration). The suppression section may issue instructions to a tilt mechanism to suppress a tilt motion.

(Seventh Configuration)

In any one of the second through sixth configurations, the torque calculating section may include a brake fluid pressure calculating section that calculates a brake fluid pressure in each wheel that can obtain the yaw moment change rate. The torque control section may include a brake fluid pressure control section that controls a brake fluid pressure in a fluid pressure controlling unit, based on the brake fluid pressure calculated by the brake fluid pressure calculating section (seventh configuration).

(Eighth Configuration)

In any one of the second through seventh configurations, the torque calculating section may include a driving force calculating section that calculates a driving force in each wheel that can obtain the yaw moment change rate. The torque control section may include a driving force controlling section that controls a driving force based on the driving force calculated by the driving force calculating section.

The posture control device may further include:

a lean angle calculating section that calculates a lean angle (roll angle) of the vehicle based on a roll rate;

a vehicle speed detecting section that calculates a vehicle body speed of the vehicle in a traveling direction based on a longitudinal acceleration, a front wheel speed Vf, and a rear wheel speed Vr; and a side-slip acceleration calculating section that calculates a front wheel side-slip acceleration and a rear wheel side-slip acceleration based on a yaw rate, a lean angle of the vehicle body, a lateral acceleration, and the vehicle body speed calculated by the vehicle speed detecting section.

A target yaw moment deviation amount may be obtained by the expression below. In the expression, the upper equation represents a case where a target yaw moment deviation amount is obtained using a static value, and the lower equation represents a case where a target yaw moment deviation amount is obtained using a dynamic value.

$$\Delta I \frac{dr}{dt} = l_f \times \frac{dV_f}{dt} \times m_f - l_r \times \frac{dV_r}{dt} \times m_r \qquad \text{[Expression 1]}$$

$$\Delta I \frac{dr}{dt} = l_{fd} \times \frac{dV_f}{dt} \times m_{fd} - l_{rd} \times \frac{dV_r}{dt} \times m_{rd}$$

where r (=dΨ/dt) is a yaw rate on a tire ground plane, Vf is a side-slip speed (integral value of a side-slip acceleration) of a front wheel speed, and Vr is a side-slip speed of a rear wheel speed, and ΔI is a yaw moment of inertia (inertia).

As one embodiment of the present teaching, the longitudinal force calculating section may estimate a longitudinal force based on a detection value of a throttle sensor and a detection value (brake pressure) of a brake modulator. Suppose θ is a roll angle, θ″ is a roll angle acceleration, h is a distance between a barycenter point and an intersection point, Ay is a ground position lateral acceleration, and Ftotal is a lateral force, the lateral force calculating section may calculate a lateral force Ftotal using the following equation:

$$F\text{total} = m \cdot Ay + m \cdot h \cdot \theta''/\cos\theta$$

The ground position lateral acceleration Ay is calculated based on a lateral acceleration, a roll angle acceleration, a yaw angle acceleration, a roll angle, and a barycenter point of the vehicle.

As one embodiment of the present teaching, the brake fluid pressure control section may perform control concerning opening and closing operations of a retention valve and a pressure reducing valve, and control concerning a driving stop operation of a pump. With this configuration, a brake fluid pressure in each wheel can be controlled so that a braking force of each wheel is changed and, thereby, a posture of the vehicle can be controlled.

As one embodiment of the present teaching, in a case where the torque control section controls a driving force of each wheel, a wheel-in motor is disposed in at least front wheels (the front right wheel and the front left wheel), and the torque control section may control the wheel-in motor.

As one embodiment of the present teaching, the straddled vehicle further includes:

a roll rate sensor that detects a roll rate of the vehicle;

a yaw rate sensor that detects a yaw rate of the vehicle;

a lateral acceleration sensor that detects a lateral acceleration of the vehicle;

a longitudinal acceleration sensor that detects a longitudinal acceleration of the vehicle;

a front wheel speed sensor that detects a front wheel speed of the vehicle; and a rear wheel speed sensor that detects a rear wheel speed of the vehicle.

In a case where the front wheels include left and right wheels, the straddled vehicle may include a front right wheel speed sensor that detects a front right wheel speed and a front left wheel speed sensor that detects a front left wheel speed.

As one embodiment of the present teaching, the posture control device may further include a storage section that stores:

a roll rate detected by a roll rate sensor that detects a roll rate of the vehicle;

a yaw rate detected by a yaw rate sensor that detects a yaw rate of the vehicle;

a lateral acceleration detected by a lateral acceleration sensor that detects a lateral acceleration of the vehicle;

the longitudinal acceleration detected by the longitudinal acceleration sensor that detects a longitudinal acceleration of the vehicle;

a front wheel speed detected by a front wheel speed sensor that detects a front wheel speed of the vehicle; and a rear wheel speed detected by a rear wheel speed sensor that detects a rear wheel speed of the vehicle.

In the case where the front wheels include left and right wheels, for example, the front wheel speed may be a front right wheel speed detected by the front right wheel speed sensor that detects a front right wheel speed and a front left wheel speed detected by the front left wheel speed sensor that detects a front left wheel speed.

As one embodiment of the present teaching, the posture control device may further include a storage section that stores:

a roll rate of the vehicle;

a yaw rate of the vehicle;

a lateral acceleration of the vehicle;

a longitudinal acceleration of the vehicle;

a front wheel speed of the vehicle; and a rear wheel speed of the vehicle.

In the case where the front wheels include left and right wheels, the front wheel speed may be, for example, a front right wheel speed and a front left wheel speed.

(Ninth Configuration)

A straddled vehicle with a ninth configuration is a straddled vehicle including at least one front wheel and at least one rear wheel, one of which includes left and right wheels, wherein the straddled vehicle turns with a lean, and the posture control device with any one of the first through eighth configurations is mounted on the straddled vehicle.

The straddled vehicle with the ninth configuration includes a tilt mechanism section that may include a suppression mechanism that suppresses a tilt motion.

The straddled vehicle may further include:

a body frame;

a right front wheel and a left front wheel arranged in a left-right direction when the vehicle whose body frame is in an upright position is seen from the front;

a center rear wheel disposed behind the right front wheel and the left front wheel in a front-rear direction of the body frame and disposed between the right front wheel and the left front wheel when the vehicle whose body frame is in the upright position is seen from the front;

a right buffer device that supports the right front wheel on a lower portion of the right buffer device and buffers displacement of the right front wheel relative to an upper portion of the right buffer device in a top-bottom direction of the body frame;

a left buffer device that supports the left front wheel on a lower portion of the left buffer device and buffers displacement of the left front wheel relative to an upper portion of the left buffer device in a top-bottom direction of the body frame; and a linkage mechanism that is disposed above the right front wheel and the left front wheel in a top-bottom direction of the body frame in the upright position, and that rotatably supports an upper portion of the right buffer device and an upper portion of the left buffer device, at least a portion of the linkage mechanism being supported by the body frame to be rotatable about a rotation axis extending forward in the front-rear direction of the body frame and upward in the top-bottom direction of the body frame.

Another teaching provides a straddled vehicle including at least one front wheel and at least one rear wheel one of which includes left and right wheels, and configured to turn with a lean, wherein the posture control device described above is mounted on the straddled vehicle.

In the teaching, the tilt mechanism section of the vehicle includes a suppression mechanism that suppresses a tilt motion. Examples of the suppression mechanism include a damper that can be electronically controlled, wherein the damper can suppress a tilt motion by reducing a rotational speed of the linkage mechanism. The tilt motion is suppressed in accordance with instructions from the suppression section of the posture control device.

With this configuration, braking and driving forces of each wheel for controlling a posture of the vehicle are incorporated with a tilt motion so that the change rate of a vehicle behavior with changes in braking and driving forces can be reduced, and in addition, the effect of suppressing a vehicle behavior can be enhanced.

Embodiments of the present teaching will be described hereinafter with reference to the drawings.

In the drawings, arrow F represents the forward direction of the vehicle. Arrow B represents the rearward direction of the vehicle. Arrow U represents the upward direction of the vehicle. Arrow D represents the downward direction of the vehicle. Arrow R represents the rightward direction of the vehicle. Arrow L represents the leftward direction of the vehicle.

The vehicle turns with a body frame being leaned in the left direction of the vehicle or in the right direction of the vehicle relative to the vertical direction. Thus, in addition to the directions relative to the vehicle, directions relative to the body frame are defined. In the accompanying drawings, arrow FF represents the forward direction of the body frame. Arrow FB represents the rearward direction of the body frame. Arrow FU represents the upward direction of the body frame. Arrow FD represents the downward direction of the body frame. Arrow FR represents the rightward direction of the body frame. Arrow FL represents the leftward direction of the body frame.

The "top-bottom direction of the body frame" herein refers to the top-bottom direction relative to the body frame when seen from a rider driving the vehicle. The "left-right direction of the body frame" herein refers to the left-right direction relative to the body frame when seen from the rider driving the vehicle. The "front-rear direction of the body frame" herein refers to the front-rear direction relative to the body frame when seen from the rider driving the vehicle.

In a left-right-wheel-equipped leaning vehicle to which this embodiment is applied, when the top-bottom direction of the body frame coincides with the vertical direction, the body frame is in an upright position. At this time, the top-bottom direction, the left-right direction, and the front-rear direction of the vehicle respectively coincide with the top-bottom direction, the left-right direction, and the front-rear direction of the body frame. The vertical direction is the same as a gravity direction.

When the left-right-wheel-equipped leaning vehicle to which this embodiment is applied travels with the body frame leaned in the left direction of the vehicle or in the right direction of the vehicle relative to the vertical direction during turning. At this time, the top-bottom direction of the vehicle does not coincide with the top-bottom direction of the body frame. Even when the body frame leans in the left direction or in the right direction relative to the vertical direction, the front-rear direction of the vehicle coincides with the front-rear direction of the body frame.

<Vehicle Body Structure>

Figure 1:
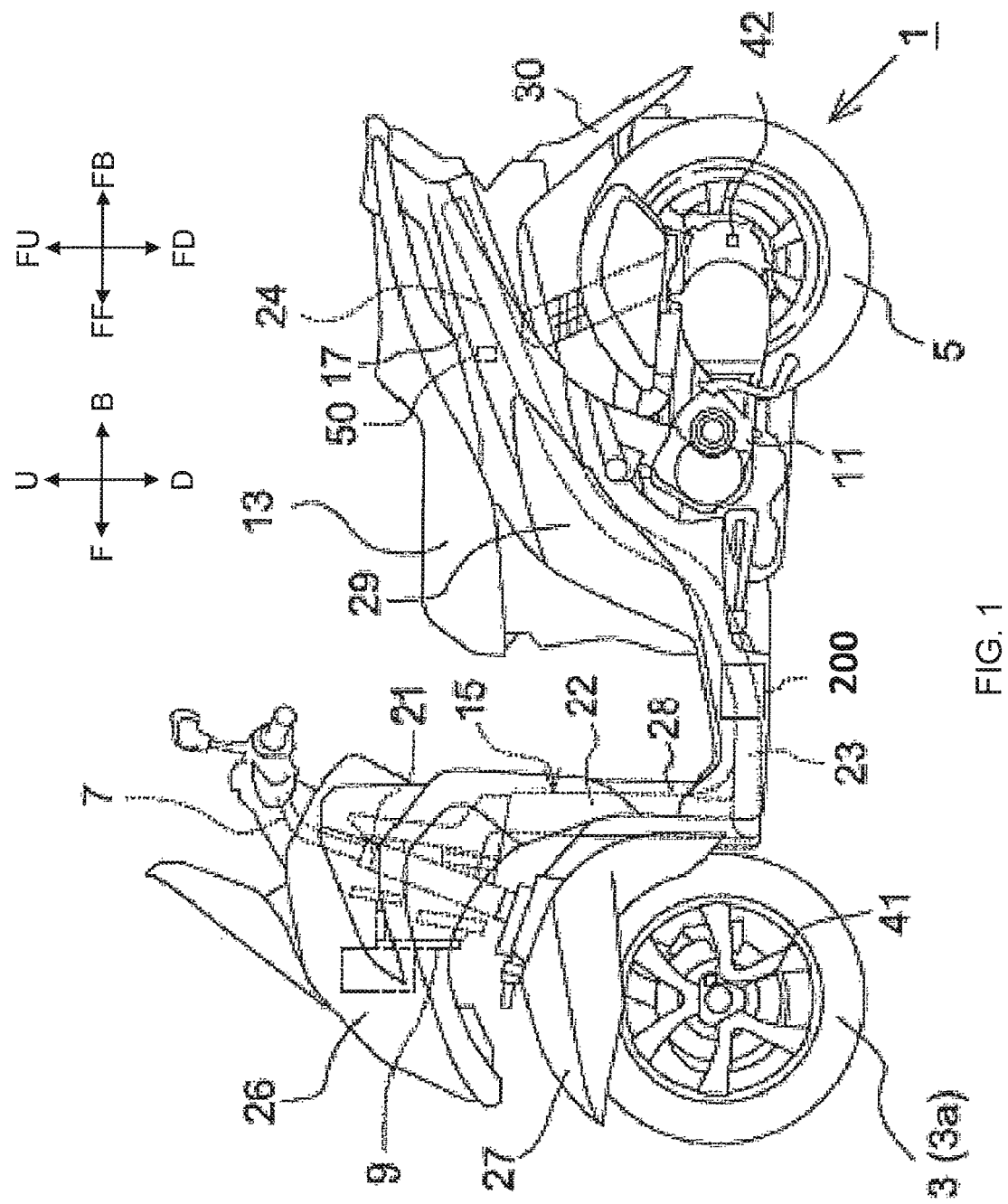
FIG. 1 is a side view of a straddled vehicle.

FIG. 1 is a schematic side view of a straddled vehicle according to this embodiment when seen from the left in the left-right direction of a body frame. It is assumed that in a vehicle 1 illustrated in FIG. 1, front wheels are steering wheels and a rear wheel is a non-steering wheel. The straddled vehicle according to this embodiment is an example of a left-right-wheel-equipped leaning vehicle.

As illustrated in FIG. 1, the vehicle 1 includes, for example, a pair of left and right front wheels 3 (3a and 3b), a rear wheel 5, a steering mechanism 7, a linkage mechanism 9, a power unit 11, a seat 13, and a body frame 15, for example. For convenience of illustration, FIG. 1 illustrates only the left front wheel 3a and does not illustrate the right front wheel 3b. In FIG. 1, a portion of the body frame 15 hidden by the vehicle body is indicated by broken lines.

The body frame 15 includes a head pipe 21, a down frame 22, an under frame 23, and a rear frame 24. The body frame 15 supports, for example, the power unit 11 and the seat 13.

The power unit 11 includes a driving source such as an engine or an electric motor and a transmission device, for example. The power unit 11 supports the rear wheel 5. A driving force of the driving source is transferred to the rear wheel 5 through the transmission device. The power unit 11 is swingably supported by the body frame 15, and the rear wheel 5 is configured to be displaced upward or downward of the body frame 15.

The head pipe 21 is disposed in a front portion of the vehicle 1, and rotatably supports a steering shaft 31 of the steering mechanism 7 (see FIG. 2 described later). The head pipe 21 is disposed in such a manner that an upper portion of the head pipe 21 is located behind a lower portion of the head pipe 21 when the body frame 15 is seen in the left-right direction of the vehicle 1. A rotation axis of the head pipe 21 is inclined relative to the top-bottom direction of the body frame 15 and extends upward and rearward of the body frame 15.

The steering mechanism 7 and the linkage mechanism 9 are disposed around the head pipe 21. The head pipe 21 supports the linkage mechanism 9, and more specifically, rotatably supports at least a portion of the linkage mechanism 9.

The down frame 22 is connected to the head pipe 21. The down frame 22 is disposed behind the head pipe 21, and extends along the top-bottom direction of the vehicle 1. The under frame 23 is connected to a lower portion of the down frame 22.

The under frame 23 extends rearward from the lower portion of the down frame 22. At the rear of the under frame 23, the rear frame 24 extends rearward and upward. The rear frame 24 supports, for example, the seat 13, the power unit 11, and a tail lamp.

The body frame 15 is covered with a body cover 17. The body cover 17 includes a front cover 26, a pair of left and right front fenders 27 (27a and 27b), a leg shield 28, a center cover 29, and a rear fender 30. The body cover 17 covers at least a portion of body parts mounted on the vehicle 1, such as the pair of left and right front wheels 3, the body frame 15, and the linkage mechanism 9.

The front cover 26 is located ahead of the seat 13, and covers at least portions of the steering mechanism 7 and the linkage mechanism 9. The leg shield 28 is configured to cover at least a portion of the legs of a rider from the front, and is disposed behind the pair of left and right front wheels 3 and ahead of the seat 13. The center cover 29 is disposed to cover at least a portion of the periphery of the rear frame 24.

At least a portion of the front fenders 27 is disposed below the front cover 26 and above the front wheels 3. At least a portion of the rear fender 30 is disposed above the rear wheel 5.

In the upright position of the vehicle 1, at least portions of the front wheels 3 (3a and 3b) are disposed below the head pipe 21 and below the front cover 26. At least a portion of the rear wheel 5 is disposed below the center cover 29 or the seat 13 and below the rear fender 30.

The front wheels 3 are provided with front wheel vehicle speed sensors 41, and the rear wheel 5 is provided with a rear wheel vehicle speed sensor 42. Based on a detection result obtained by these sensors (41 and 42), a vehicle speed of the vehicle 1 is estimated by computation. The vehicle 1 includes, at an arbitrary position, a lean detecting section 50 that detects a lean state of the vehicle 1, and detects a lean state of the vehicle 1 based on the estimated vehicle speed and other parameters. The lean detecting section 50 is constituted by a predetermined sensor group and a computation device. This will be described in detail later.

In addition, the vehicle 1 includes, inside the vehicle 1, a torque control section 100 that controls a braking torque transferred from the front wheels 3 (3a and 3b) corresponding to the steering wheels to the road surface. The torque control section 100 is constituted by, for example, an electronic control unit, and is disposed under the seat 13, for example.

<Steering Mechanism>

Figure 2:
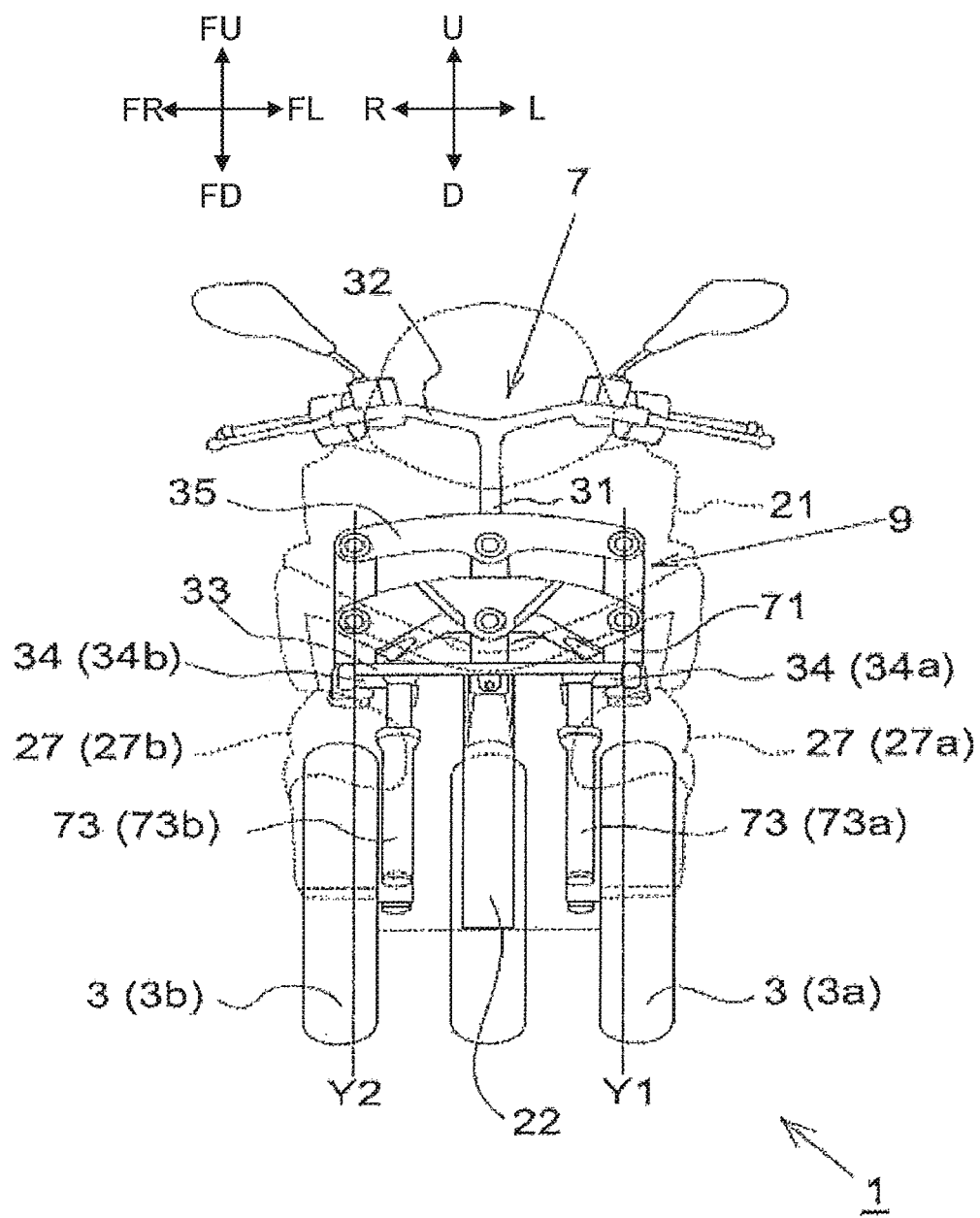
FIG. 2 is a front view of the straddled vehicle when a body frame is in an upright position.
Figure 3:
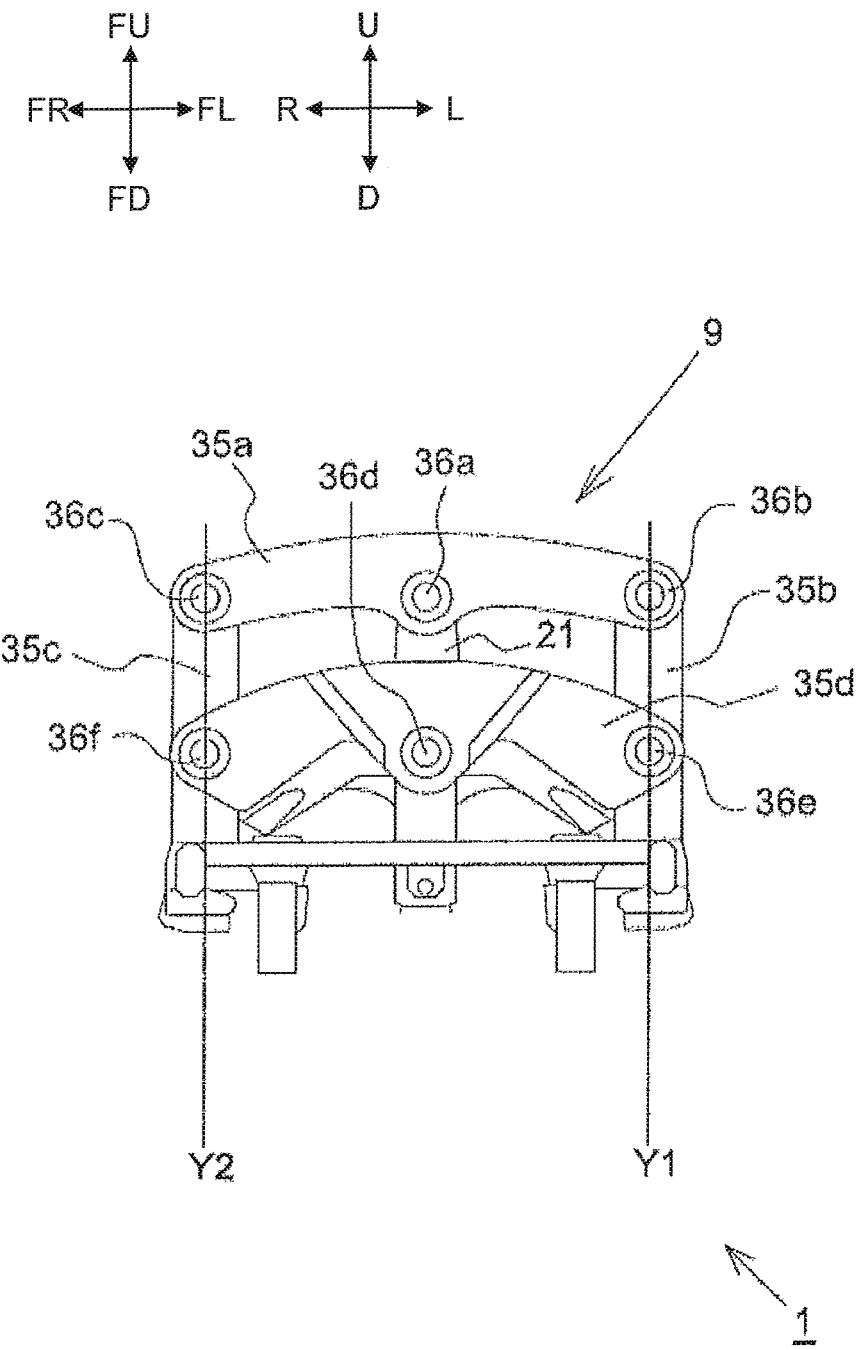
FIG. 3 is an enlarged view of a portion of FIG. 2.
Figure 4:
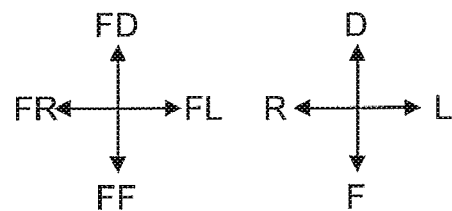
FIG. 4 is a plan view illustrating a configuration of the vehicle illustrated in FIG. 2 when viewed from above.
Figure 4:
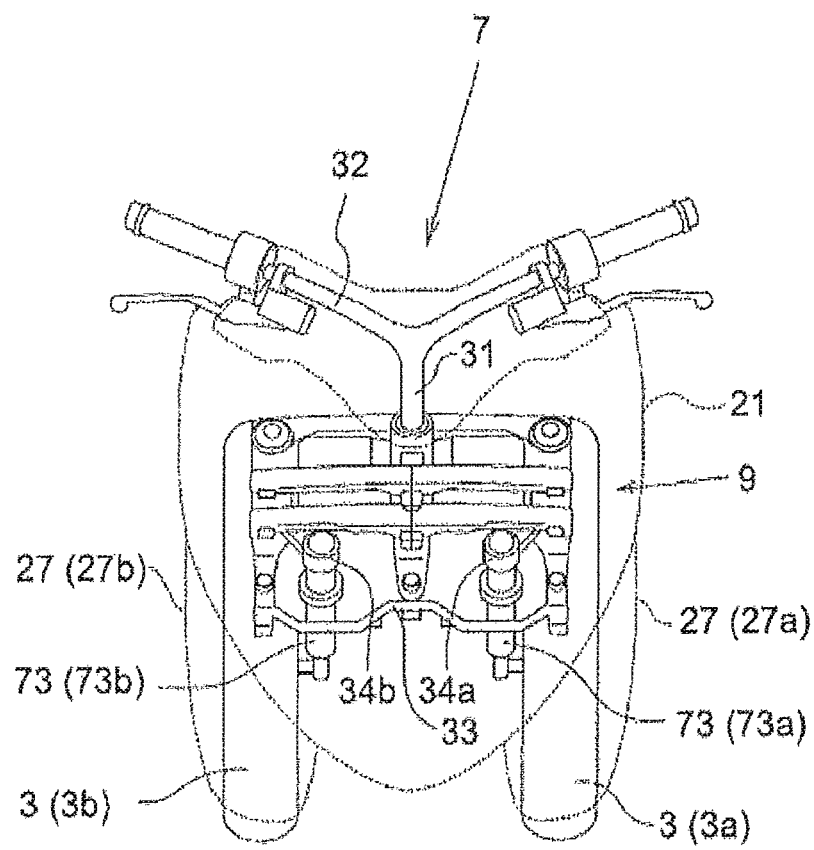

FIG. 2 is a front view of a front portion of the vehicle 1 in which the body frame 15 is in the upright position, seen from the front. FIG. 3 is an enlarged view of a portion of FIG. 2. FIG. 4 is a plan view of the vehicle 1 illustrated in FIG. 2 when seen from above. For convenience of the drawings, FIGS. 2 and 4 do not show the body cover 17.

As illustrated in FIGS. 2 and 4, the steering mechanism 7 includes a steering force transfer mechanism 71 and buffers 73 (73a and 73b).

The left front wheel 3a is disposed at the left of the down frame 22, and is supported by the left buffer 73a. The left front fender 27a is disposed above the left front wheel 3a. Similarly, the right front wheel 3b is disposed at the right of the down frame 22, and is supported by the right buffer 73b. The right front fender 27b is disposed above the right front wheel 3b.

The buffers 73 (73a and 73b) are so-called telescopic buffers. The left buffer 73a is provided in order to attenuate vibrations caused by a load on the left front wheel 3a supported by the left buffer 73a from the road surface. Similarly, the right buffer 73b is provided in order to attenuate vibrations caused by a load on the right front wheel 3*b* supported by the right buffer 73*b* from the road surface.

When the vehicle 1 is seen from the front with the body frame 15 being in the upright position, the steering force transfer mechanism 71 is disposed above the front wheels 3 (3*a* and 3*b*). The steering force transfer mechanism 71 includes a steering member for inputting a steering force of the rider. The steering member includes a steering shaft 31 and a handlebar 32 coupled to an upper portion of the steering shaft 31. A portion of the steering shaft 31 is rotatably supported by the head pipe 21, and rotates in cooperation with an operation of the handlebar 32 by the rider. The rotation axis of the steering shaft 31 extends rearward and upward of the body frame 15.

The steering force transfer mechanism 71 includes steering members including the steering shaft 31 and the handlebar 32, a tie rod 33, and brackets 34 (34*a* and 34*b*). The steering force transfer mechanism 71 transfers a steering force with which the rider operates the handlebar 32, to the brackets 34 (34*a* and 34*b*).

<Linkage Mechanism>

The vehicle 1 according to this embodiment includes the linkage mechanism 9 of a parallel four-bar linkage (also called parallelogram linkage) type.

The linkage mechanism 9 is disposed below the handlebar 32 when the vehicle 1 with the body frame 15 being in the upright position is seen from the front, and is supported by the head pipe 21. The linkage mechanism 9 includes cross members 35 (35*a*, 35*b*, 35*c*, and 35*d*).

The upper cross member 35*a* is disposed ahead of the head pipe 21 and extends in the vehicle width direction. An intermediate portion of the upper cross member 35*a* is supported on the head pipe 21 by a support part 36*a*. The support part 36*a* is a boss part provided on the head pipe 21. The upper cross member 35*a* is rotatable about an intermediate upper axis extending in the front-rear direction of the body frame 15, with respect to the head pipe 21.

The left end of the upper cross member 35*a* is supported on the left cross member 35*b* by a support part 36*b*. The support part 36*b* is a boss part provided on the left cross member 35*b*. The right end of the upper cross member 35*a* is supported on the right cross member 35*c* by a support part 36*c*. The support part 36*c* is a boss part provided on the right cross member 35*c*.

The upper cross member 35*a* is rotatable about a left upper axis extending in the front-rear direction of the body frame 15, with respect to the left cross member 35*b*. The upper cross member 35*a* is rotatable about a right upper axis extending in the front-rear direction of the body frame 15, with respect to the right cross member 35*c*. The intermediate upper axis, the left upper axis, and the right upper axis are substantially parallel. The intermediate upper axis, the left upper axis, and the right upper axis extend forward in the front-rear direction of the body frame 15 and upward in the top-bottom direction of the body frame 15.

An intermediate portion of the lower cross member 35*d* is supported on the head pipe 21 by a support part 36*d*. The support part 36*d* is a boss part provided on the head pipe 21. The lower cross member 35*d* is rotatable about an intermediate lower axis extending in the front-rear direction of the body frame 15, with respect to the head pipe 21. When the vehicle with the body frame 15 in the upright position is seen from the front, the lower cross member 35*d* is disposed below the upper cross member 35*a* in the top-bottom direction of the body frame 15. The lower cross member 35*d* has substantially the same length in the vehicle width direction as that of the upper cross member 35*a*, and is disposed substantially in parallel with the upper cross member 35*a*.

The left end of the lower cross member 35*d* is supported on the left cross member 35*b* by a support part 36*e*. The support part 36*e* is a boss part provided on the left cross member 35*b*. The right end of the lower cross member 35*d* is supported on the right cross member 35*c* by a support part 36*f*. The support part 36*f* is a boss part provided on the right cross member 35*c*. The lower cross member 35*d* is rotatable about a left lower axis extending in the front-rear direction of the body frame 15, with respect to the left cross member 35*b*. Similarly, the lower cross member 35*d* is rotatable about a right lower axis extending in the front-rear direction of the body frame 15, with respect to the right cross member 35*c*. The intermediate lower axis, the left lower axis, and the right lower axis are substantially parallel. The intermediate lower axis, the left lower axis, and the right lower axis extend forward and upward of the body frame 15.

At least a portion of the linkage mechanism 9 is rotatable about an intermediate axis extending in the front-rear direction of the vehicle 1. At least a portion of the linkage mechanism 9 is rotatable about an intermediate axis (rotation axis) extending forward and upward of the body frame 15. The intermediate axis (rotation axis) inclines relative to the horizontal direction, and extends forward and upward relative to the horizontal direction.

The left cross member 35*b* is disposed at the left of the head pipe 21. The left cross member 35*b* is disposed above the left front wheel 3*a* and the left buffer 73*a*. The left buffer 73*a* is disposed to be rotatable about a left center axis Y1 with respect to the left cross member 35*b*. The left center axis Y1 is substantially in parallel with the rotation axis of the head pipe 21.

The right cross member 35*c* is located at the right of the head pipe 21. The right cross member 35*c* is disposed above the right front wheel 3*b* and the right buffer 73*b*. The right buffer 73*b* is disposed to be rotatable about a right center axis Y2 with respect to the right cross member 35*c*. The right center axis Y2 is substantially in parallel with the rotation axis of the head pipe 21.

In this manner, the cross members 35 (35*a*, 35*b*, 35*c*, and 35*d*) are supported in such a manner that the upper cross member 35*a* and the lower cross member 35*d* are kept substantially in parallel with each other and the left cross member 35*b* and the right cross member 35*c* are kept substantially in parallel with each other.

<Steering Operation>

Figure 5:
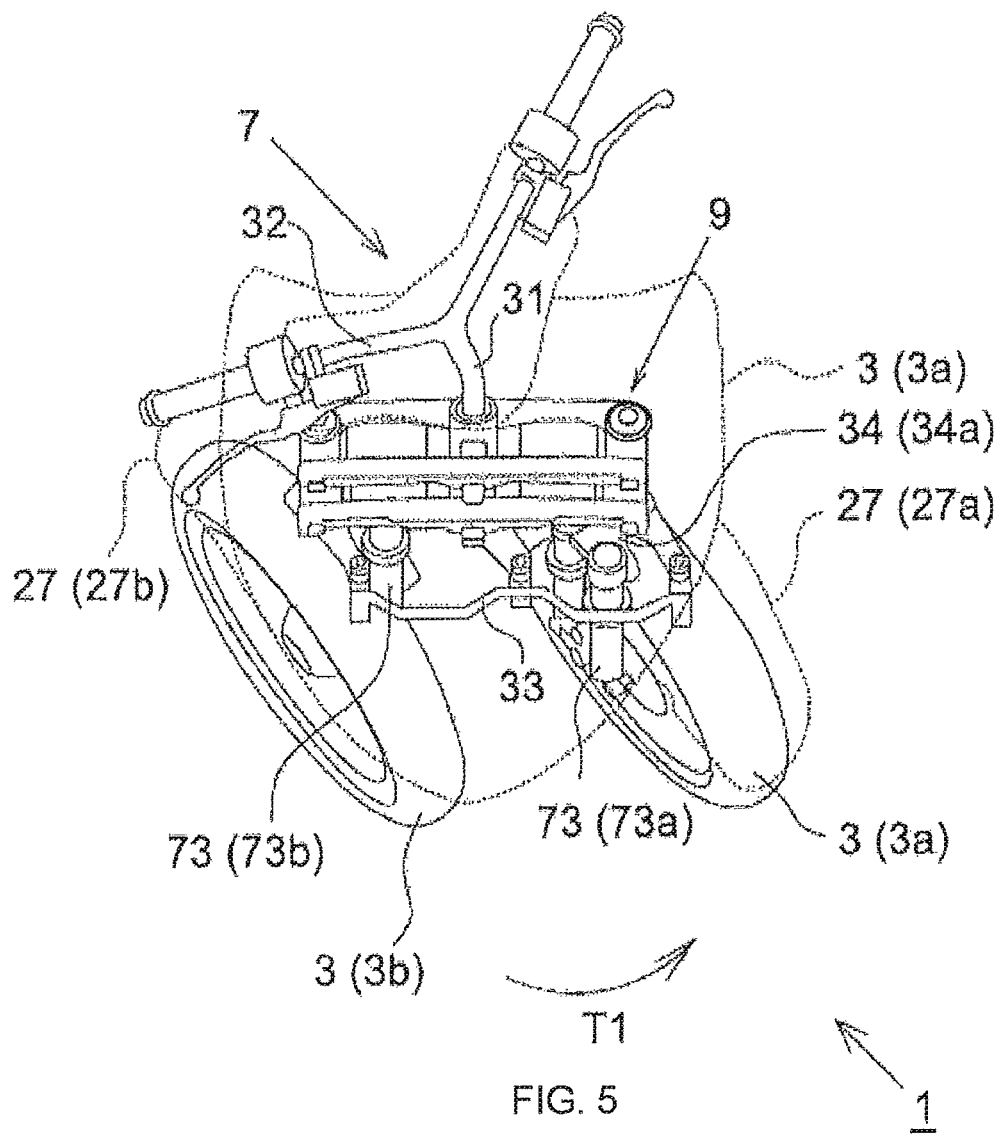
FIG. 5 is a view illustrating a vehicle front portion in a state where front wheels are steered.

FIG. 5 is a view for describing a steering operation of the vehicle 1. FIG. 5 illustrates a configuration of the vehicle 1 in a steered state when seen from the front. FIG. 5 corresponds to a view of the vehicle 1 in which the body frame 15 is in the upright position and the pair of left and right front wheels 3 are steered is seen from above the body frame 15.

As illustrated in FIG. 5, when the handlebar 32 is turned, the steering mechanism 7 operates, and a steering operation is performed.

For example, when the steering shaft 31 rotates in the direction indicated by arrow T1 in FIG. 5, for example, the tie rod 33 moves left-rearward. With the left-rearward movement of the tie rod 33, the brackets 34 (34*a* and 34*b*) rotate in the direction indicated by arrow T1. With this rotation, the left front wheel 3*a* rotates about the left center axis Y1 (see FIGS. 2 and 3), and the right front wheel 3*b* rotates about the right center axis Y2 (see FIGS. 2 and 3).

<Lean Motion>

Figure 6:
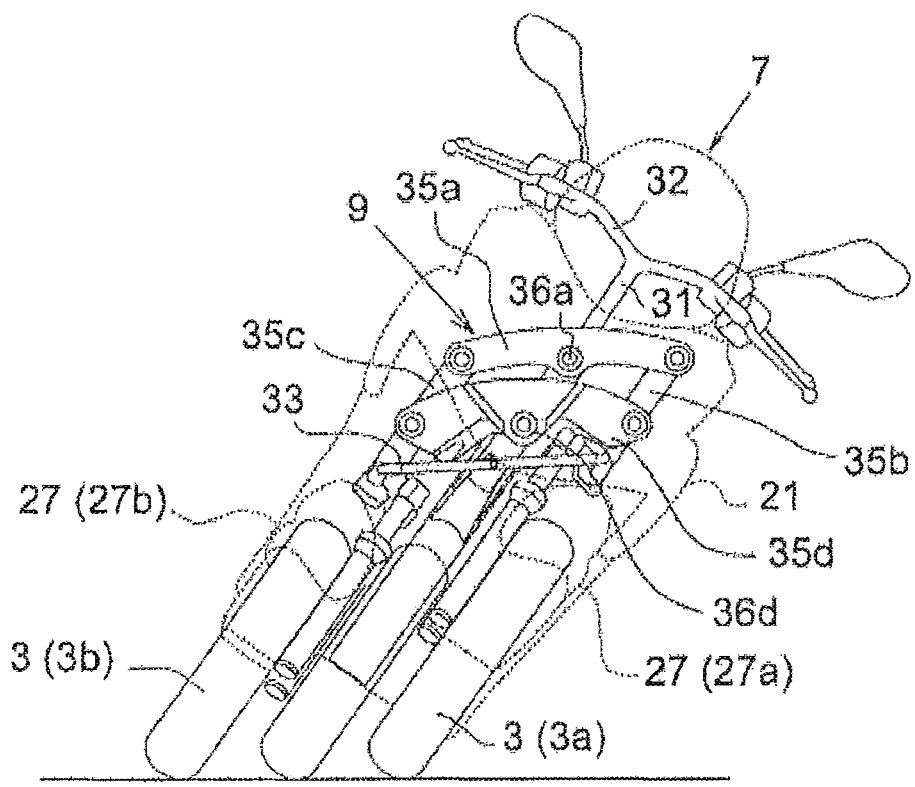
FIG. 6 is a front view of the vehicle in a state where the body frame is leaned.

FIG. 6 is a view for describing a lean motion of the vehicle 1. FIG. 6 corresponds to a view in which the vehicle 1 whose body frame 15 is leaned to the left of the vehicle 1 is seen from the front of the vehicle 1.

The linkage mechanism 9 forms substantially a rectangle when the vehicle 1 whose body frame 15 is in the upright position is seen from the front, and forms a substantially parallelogram when the vehicle 1 whose body frame 15 is leaned in the left direction of the vehicle 1 is seen from the front. Deformation of the linkage mechanism 9 is in conjunction with a lean of the body frame 15 in the left direction or in the right direction. An operation of the linkage mechanism 9 refers to a change of the shape of the linkage mechanism 9 caused when the cross members 35 (35a, 35b, 35c, and 35d) of the linkage mechanism 9 for performing a lean motion rotate relative to each other using their support points as axes.

For example, the cross members 35 (35a, 35b, 35c, and 35d), which are arranged substantially in a rectangle in a front view in the case where the vehicle 1 is in the upright position, is deformed into substantially a parallelogram in a state where the vehicle 1 leans. In conjunction with a lean of the body frame 15, the left front wheel 3a and the right front wheel 3b also lean in the left direction of the vehicle 1 or in the right direction of the vehicle 1.

For example, when the rider leans the vehicle 1 to the left, the head pipe 21 leans to the left relative to the vertical direction. When the head pipe 21 leans, the upper cross member 35a rotates about the support part 36a with respect to the head pipe 21, and the lower cross member 35d rotates about the support part 36d with respect to the head pipe 21. Then, the upper cross member 35a moves to the left of the lower cross member 35d, and the left cross member 35b and the right cross member 35c lean relative to the vertical direction while being kept substantially in parallel with the head pipe 21. At this time, the left cross member 35b and the right cross member 35c rotate with respect to the upper cross member 35a and the lower cross member 35d. That is, when the vehicle 1 is leaned, the left cross member 35b and the right cross member 35c lean, and the left wheel 3a supported by the left cross member 35b and the right wheel 3b supported by the right cross member 35c lean relative to the vertical direction while being kept substantially in parallel with the head pipe 21.

Even when the vehicle 1 leans, the tie rod 33 is kept substantially in parallel with the upper cross member 35a and the lower cross member 35d.

In the manner described above, the linkage mechanism 9 that causes the left wheel 3a and the right wheel 3b to lean by performing the lean motion is disposed above the left wheel 3a and the right wheel 3b. That is, the rotation axes of cross members 35 (35a, 35b, 35c, and 35d) constituting the linkage mechanism 9 are disposed above the left wheel 3a and the right wheel 3b.

<Steering Operation+Lean Motion>

Figure 7:
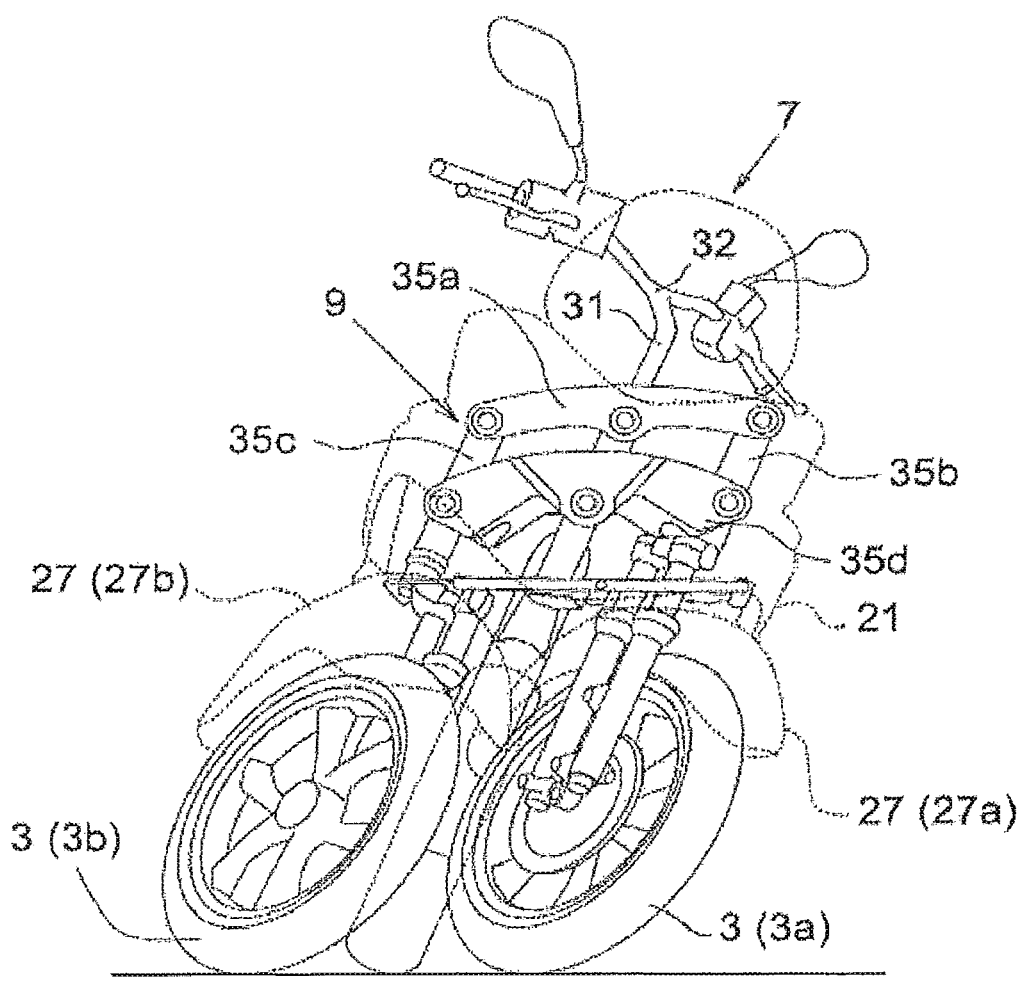
FIG. 7 is a front view of the vehicle in a state where the front wheels are steered and the body frame is leaned.

FIG. 7 is a front view of the vehicle 1 in a state where the left wheel 3a and the right wheel 3b are steered and the body frame 15 is leaned in the left direction or in the right direction. FIG. 7 illustrates a state where the left wheel 3a and the right wheel 3b are steered leftward to cause the body frame 15 to lean leftward. FIG. 7 is a view of the vehicle 1 in which the pair of left and right front wheels 3 (3a and 3b) are steered with the body frame 15 leaned leftward in the vehicle 1, seen from the front of the vehicle 1. In an operation illustrated in FIG. 7, orientations of the front wheels 3 (3a and 3b) are changed by a steering operation, and the front wheels 3 (3a and 3b) lean together with the body frame 15 by the lean motion. In this state, the cross members 35 (35a, 35b, 35c, and 35d) of the linkage mechanism 9 are formed in a parallelogram, and the tie rod 33 moves in a steering direction (leftward in FIG. 7) and rearward.

<Lean Detection>

Figure 8:
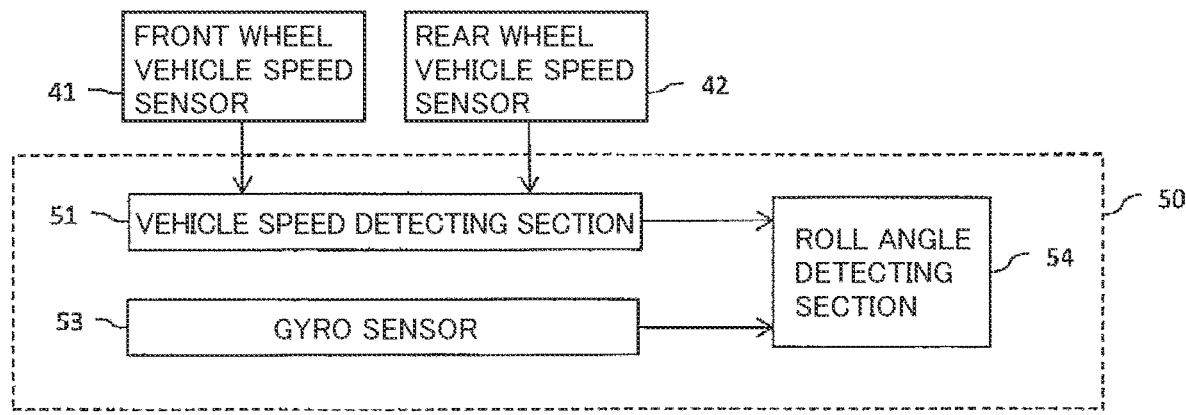
FIG. 8 is a functional block diagram illustrating a lean detecting section.

FIG. 8 is a functional block diagram illustrating a configuration of the lean detecting section 50. In this embodiment, the lean detecting section 50 includes a vehicle speed detecting section 51, a gyro sensor 53, and a roll angle detecting section 54. The vehicle speed detecting section 51 and the roll angle detecting section 54 can be implemented by, for example, an arithmetic processing device. The lean detecting section 50 is not limited to the configuration illustrated in FIG. 8 as long as a lean state of the vehicle 1 can be detected.

When the rider steers the handlebar 32 of the vehicle 1 while turning around a curve (e.g., in the state illustrated in FIG. 5), a yaw rate of the vehicle 1 changes. When the rider leans the vehicle 1 to the center of curve (e.g., in the state illustrated in FIG. 6), a roll rate of the vehicle 1 changes. The gyro sensor 53 detects angular velocities in two axis directions of yaw and roll of the vehicle 1. That is, the gyro sensor 53 detects the yaw rate and the roll rate of the vehicle 1.

The front wheel vehicle speed sensors 41 detect a rotation speed of the front wheels 3. The rear wheel vehicle speed sensor 42 detects a rotation speed of the rear wheel 5. The vehicle 1 according to this embodiment includes the pair of front wheels 3 (3a and 3b).

The vehicle speed detecting section 51 detects the vehicle speed of the vehicle 1 based on detection values input from the front wheel vehicle speed sensor 41 and the rear wheel vehicle speed sensor 42. The roll angle detecting section 54 receives a roll rate of the vehicle 1 from the gyro sensor 53. Based on these input values, the roll angle detecting section 54 detects a roll angle (lean state) of the vehicle 1. An example of a method for detecting a roll angle of the vehicle 1 will be described with reference to FIGS. 9A and 9B.

Figure 9A:
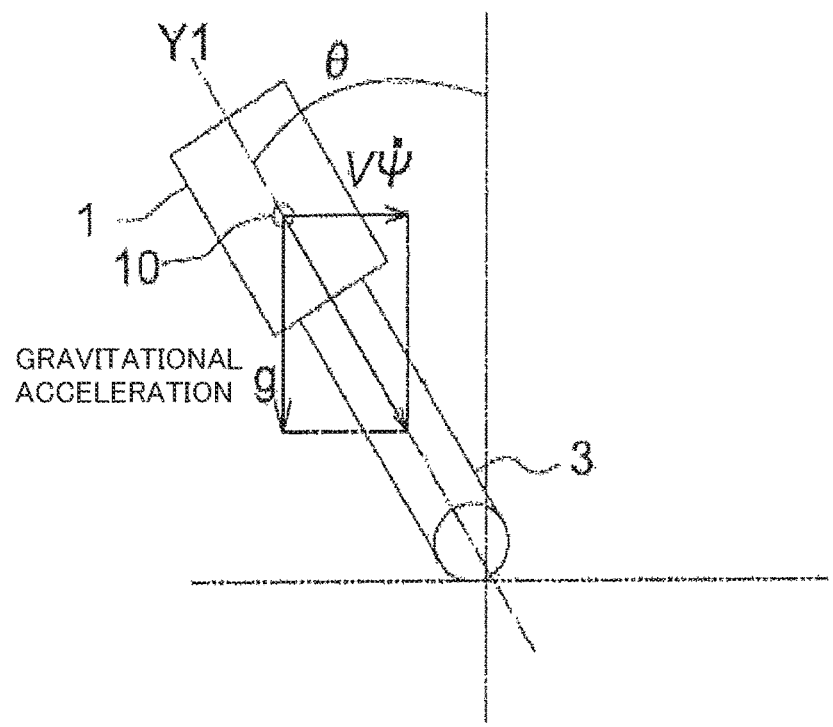
FIG. 9A is a schematic illustration of an acceleration generated at a barycenter of the vehicle.
Figure 9B:
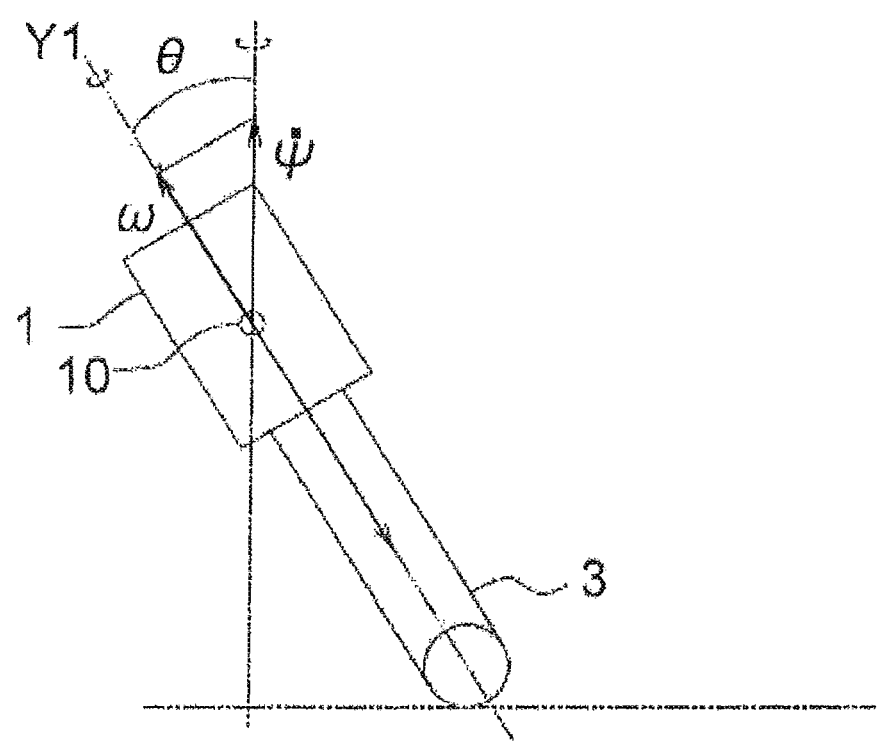
FIG. 9B is a schematic illustration of an angular velocity generated in the vehicle.

FIG. 9A schematically illustrates an acceleration generated at a barycenter 10 of the vehicle 1. FIG. 9B schematically illustrates an angular velocity generated in the vehicle 1, and shows that a vehicle body fixed axis (axis Y1) passes through the barycenter 10 for convenience of description. Such a method for detecting a roll angle of the vehicle 1 is a detection method in an ideal state where the vehicle 1 is turning at a speed V in a lean-with state with a pitching and a tire thickness of the vehicle 1 ignored. The lean-with state refers to a state in which the vehicle body fixed axis (axis Y1) and the upper body of the rider are on the same line.

With reference to FIG. 9A, a relationship between a roll angle θ while the vehicle 1 is turning and the vehicle body speed V, a differentiation of a Euler's yaw angle 4', and a gravitational acceleration g is expressed as follows: where (dΨ/dt) is a yaw rate (yaw angular velocity) as a time differential of a yaw angle.

$$\theta = \arctan(V \cdot (d\Psi/dt)/g) \quad (1)$$

With reference to FIG. 9B, a relationship between a roll angle θ while the vehicle 1 is turning and a yaw rate ω detected by the gyro sensor 53 fixed to the vehicle 1, and a differentiation of a Euler's yaw angle Ψ is expressed as follows: where in FIG. 9B, ω represents an angular velocity generated around the axis in the top-bottom direction fixed to the vehicle body, and the length of the arrow represents the degree of the angular velocity, and (dΨ/dt) is an angular velocity generated around the vertical axis.

$$\theta = \arccos(\omega/(d\Psi/dt)) \quad (2)$$

From Equations (1) and (2), the following relationship is derived.

$$\theta = \arcsin(V \cdot \omega/g) \quad (3)$$

<Braking Operation>

Figure 10:
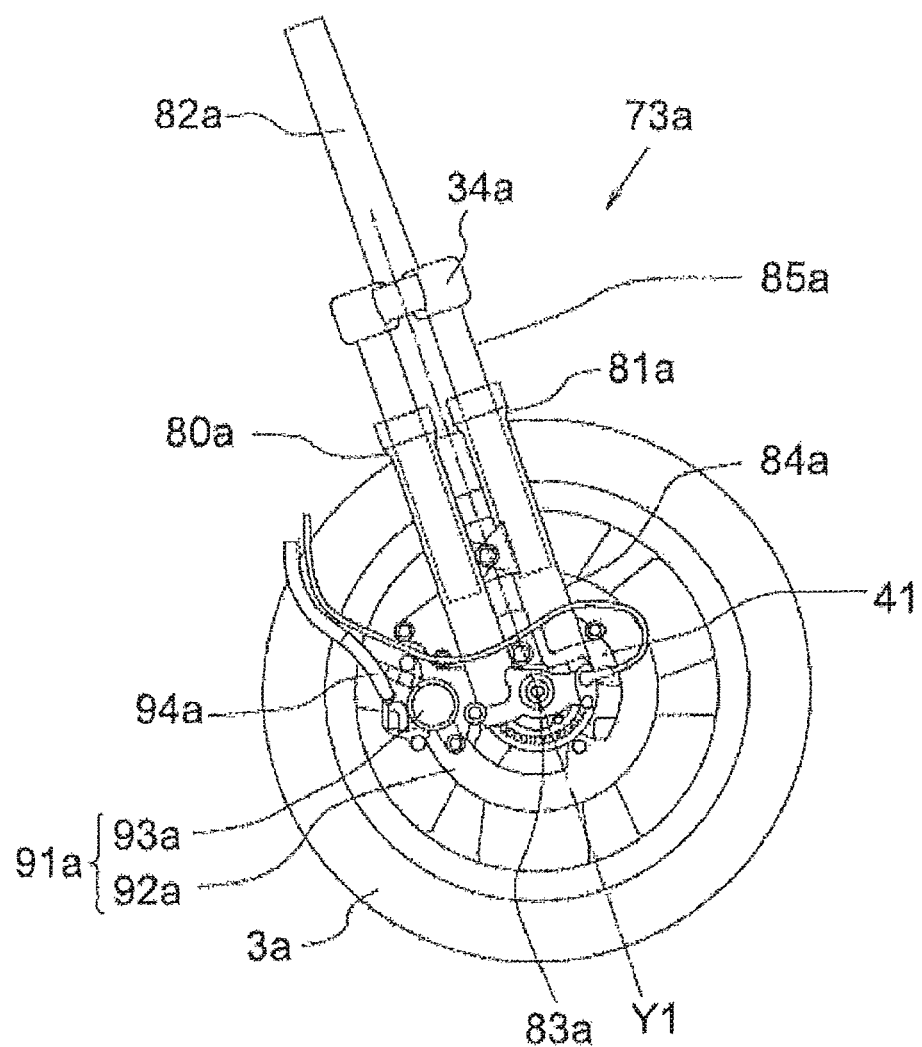
FIG. 10 is a side view of a left buffer of the vehicle illustrated in FIG. 1.

FIG. 10 is a side view illustrating an example configuration of the left buffer 73a when seen from the right side of the vehicle 1 illustrated in FIG. 1. The same holds for the right buffer, and thus, description will not be repeated.

As illustrated in FIG. 10, the left buffer 73a includes a left rear telescopic element 80a, a left front telescopic element 81a, a left cross member support part 82a, and the left bracket 34a. The left rear telescopic element 80a has an extension and contraction configuration that extends and contracts along the left center axis Y1 under the presence of an elastic member (not shown) such as a spring and a buffer member (not shown) such as oil disposed therein. The left rear telescopic element 80a has a damper function of absorbing vibrations and shocks caused by a load exerted on the left front wheel 3a from the road surface.

The left front telescopic element 81a is disposed at the same side as the left rear telescopic element 80a with respect to the left front wheel 3a in the rotation axis of the left wheel shaft 83a. The left rear telescopic element 80a and the left front telescopic element 81a are arranged in the front-rear direction of the vehicle at the right of the left front wheel 3a in the state where the vehicle 1 is in the upright position. The left front telescopic element 81a is disposed ahead of the left rear telescopic element 80a. In a manner similar to the left rear telescopic element 80a, the left front telescopic element 81a has an extension and contraction structure that extends and contracts along the left center axis Y1. The extension and contraction direction of the left rear telescopic element 80a and the extension and contraction direction of the left front telescopic element 81a are parallel when seen in the rotation axis direction of the left front wheel 3a.

An upper portion of the left rear telescopic element 80a and an upper portion of the left front telescopic element 81a are coupled to each other by the left bracket 34a. The lower end of the left front telescopic element 81a is coupled and fixed to a portion near the lower end of the left rear telescopic element 80a. The left front wheel 3a is supported on the left bracket 34a by the two telescopic elements of the left rear telescopic element 80a and the left front telescopic element 81a arranged in parallel in the front-rear direction of the vehicle 1. Thus, an outer element 84a located on a side of a lower portion of the left buffer 73a does not rotate about an axis parallel to the extension and contraction direction of the telescopic elements, relative to an inner element 85a disposed on a side of an upper portion of the left buffer 73a.

The left bracket 34a is located below the front cover 26 when the vehicle 1 whose body frame 15 is in the upright position is seen from above.

The left front wheel 3a includes a left front brake 91a that generates a braking force of the left front wheel 3a. The left front brake 91a includes a left brake disc 92a and a left caliper 93a. The left brake disc 92a has a ring shape around the left wheel shaft 83a. The left brake disc 92a is fixed to the left front wheel 3a. The left caliper 93a is fixed to a lower portion of the left rear telescopic element 80a of the left buffer 73a. An end of a left brake pipe 94a is connected to the left caliper 93a, and the left caliper 93a receives a fluid pressure through the left brake pipe 94a. The left caliper 93a causes brake pads to move by the received fluid pressure. The brake pads contact the right side surface and the left side surface of the left brake disc 92a. The left caliper 93a brakes rotation of the left brake disc 92a by sandwiching the left brake disc 92a between the brake pads.

Figure 11:
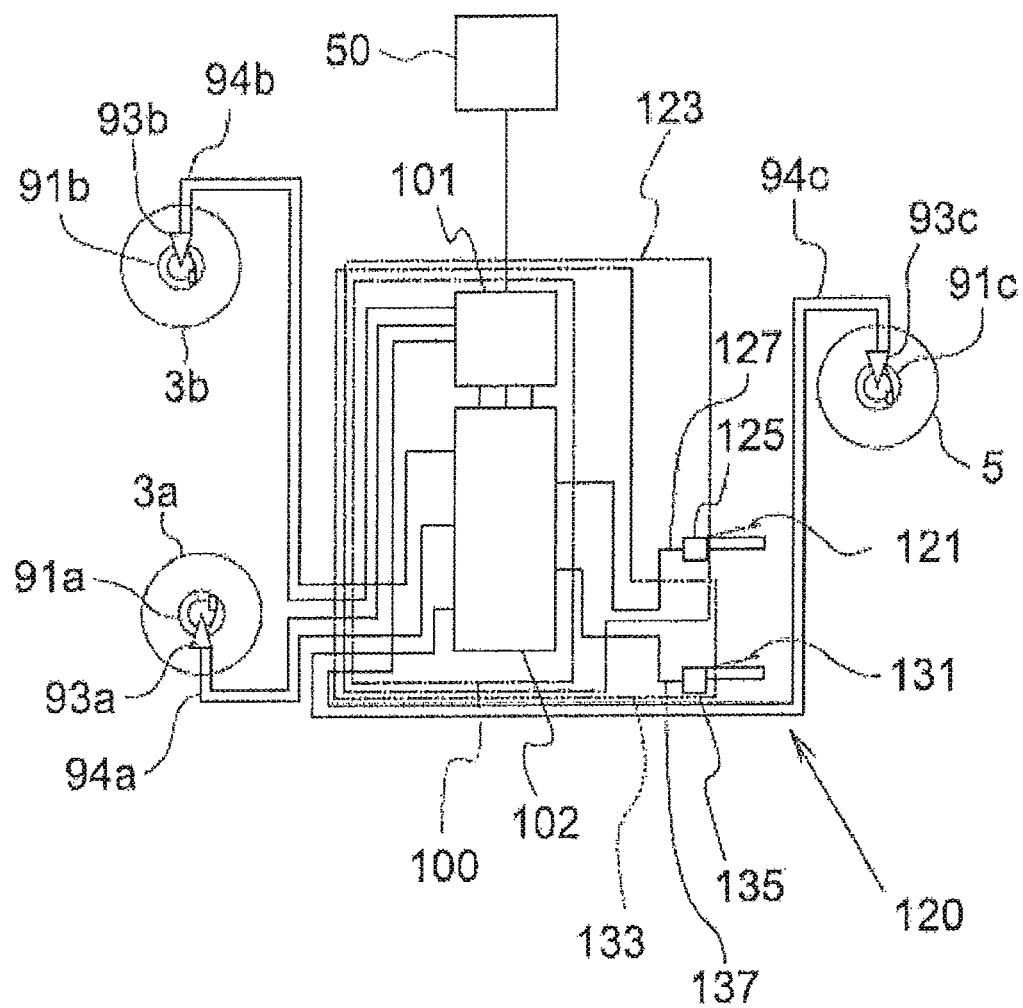
FIG. 11 is a block diagram illustrating a brake system included in the vehicle.

FIG. 11 is a block diagram illustrating a configuration of a brake system 120 included in the vehicle 1. The brake system 120 includes the left front brake 91a and a right front brake 91b. As previously described with reference to FIG. 10, the left front brake 91a is provided to the left front wheel 3a and generates a braking force of the left front wheel 3a. The right front brake 91b is provided to the right front wheel 3b and generates a braking force of the right front wheel 3b. The left front brake 91a corresponds to a "left brake section" and the right front brake 91b corresponds to a "right brake section." The brake system 120 includes a brake actuation device 123.

The brake system 120 includes an input member 121 configured to be operable by the rider driving the vehicle 1. The input member 121 is in a lever shape, for example. The input member 121 corresponds to a "brake operating element."

The brake system 120 includes a torque control section 100. The torque control section 100 includes an electronic control unit 101 and a fluid pressure controlling unit 102 actuated by the electronic control unit 101.

The brake actuation device 123 includes a front master cylinder 125. When the input member 121 is operated by the rider, the front master cylinder 125 is actuated and generates a fluid pressure. The generated fluid pressure is transferred to the torque control section 100 through a front brake pipe 127. The electronic control unit 101 included in the torque control section 100 controls the fluid pressure controlling unit 102 in order to generate a fluid pressure in accordance with the transferred fluid pressure, the rotation speed of each wheel, a lean state of the vehicle 1, and so forth.

The fluid pressure generated by the fluid pressure controlling unit 102 is transferred to the left caliper 93a through a left brake pipe 94a. Accordingly, the left front brake 91a is actuated. Similarly, the fluid pressure generated by the fluid pressure controlling unit 102 is transferred to a right caliper 93b through a right brake pipe 94b. Accordingly, the right front brake 91b is actuated. The left brake pipe 94a corresponds to a "left pipe" and the right brake pipe 94b corresponds to a "right pipe."

The vehicle 1 is configured such that the fluid pressure of brake fluid filling the left brake pipe 94a and the fluid pressure of brake fluid filling the right brake pipe 94b can be adjusted by the electronic control unit 101 independently of each other.

The brake system 120 may include a WC pressure sensor that detects a fluid pressure (fluid pressure of wheel cylinder: WC pressure) of each of the calipers 93a, 93b, and 93c of the left front brake 91a, the right front brake 91b, and a rear brake 91c. The electronic control unit 101 can acquire a fluid pressure, that is, a WC pressure, of each brake detected by the WC pressure sensor and can use the acquired pressure for a control process.

The fluid pressure controlling unit 102 may include a valve for controlling a flow of a fluid pressure based on operations of the input members 121 and 131, and a pump for increasing the fluid pressure to be transferred. The fluid pressure controlling unit 102 can control the fluid pressure, that is, a braking torque, of each of the left front brake 91a, the right front brake 91b, and the rear brake 91c by operating the valve and the pump in accordance with a control signal from the electronic control unit 101. That is, the fluid pressure controlling unit 102 has a configuration for controlling the fluid pressures of the left front brake 91a, the right front brake 91b, and the rear brake 91c independently of each other in accordance with control of the electronic control unit 101.

For example, the fluid pressure controlling unit 102 may be configured to include a retention valve, a pump, and a pressure reducing valve, for example. The retention valve controls a flow rate of brake fluid in each of the input members 121 and 131, the right front brake 91b, and the left front brake 91a. The pump increases the fluid pressure of each of the right front brake 91b and the left front brake 91a. The pressure reducing valve reduces the fluid pressure of each of the right front brake 91b and the left front brake 91a. The torque control section 100 controls distribution of the fluid pressure to the right front brake 91b and the left front brake 91a by controlling operations of the retention valve, the pump, the pressure reducing valve, and other members. A control method for the fluid pressure controlling unit 102 is not limited to a specific method. A method of electrically controlling the fluid pressure, a method combining a fluid pressure pipe and a mechanical valve, and any other method may be employed as a control method for the fluid pressure controlling unit 102.

In the vehicle 1 according to this embodiment, the brake system 120 includes the rear brake 91c that generates a braking force of the rear wheel 5. The brake system 120 includes another input member 131 different from the input member 121. The brake system 120 includes a brake actuation device 133.

The brake actuation device 133 includes a rear master cylinder 135. When the input member 131 is operated by the rider, the rear master cylinder 135 is actuated and generates a fluid pressure. The generated fluid pressure is transferred to the torque control section 100 through a rear brake pipe 137. In a manner similar to the case of operating the input member 121, the electronic control unit 101 controls the fluid pressure controlling unit 102 in order to generate a fluid pressure in accordance with the transferred fluid pressure, the rotation speed of each wheel, a lean state of the vehicle 1, and so forth. In the vehicle 1 according to this embodiment, the brake actuation device 133 actuates the right front brake 91b, the left front brake 91a, and the rear brake 91c by an operation of the input member 131. That is, the fluid pressure generated by the fluid pressure controlling unit 102 is transferred to the left caliper 93a through the left brake pipe 94a. Accordingly, the left front brake 91a is actuated. Similarly, the fluid pressure generated by the fluid pressure controlling unit 102 is transferred to the right caliper 93b through the right brake pipe 94b. Accordingly, the right front brake 91b is actuated. Similarly, the fluid pressure generated by the fluid pressure controlling unit 102 is transferred to the rear caliper 93c through a rear brake pipe 94c. Accordingly, the rear brake 91c is actuated.

In a case where the input member 131 is operated, only the rear brake 91c may be actuated. On the other hand, in a case where the input member 121 is operated, the rear brake 91c may be actuated in addition to the right front brake 91b and the left front brake 91a.

<Posture Control Device>

Figure 12:
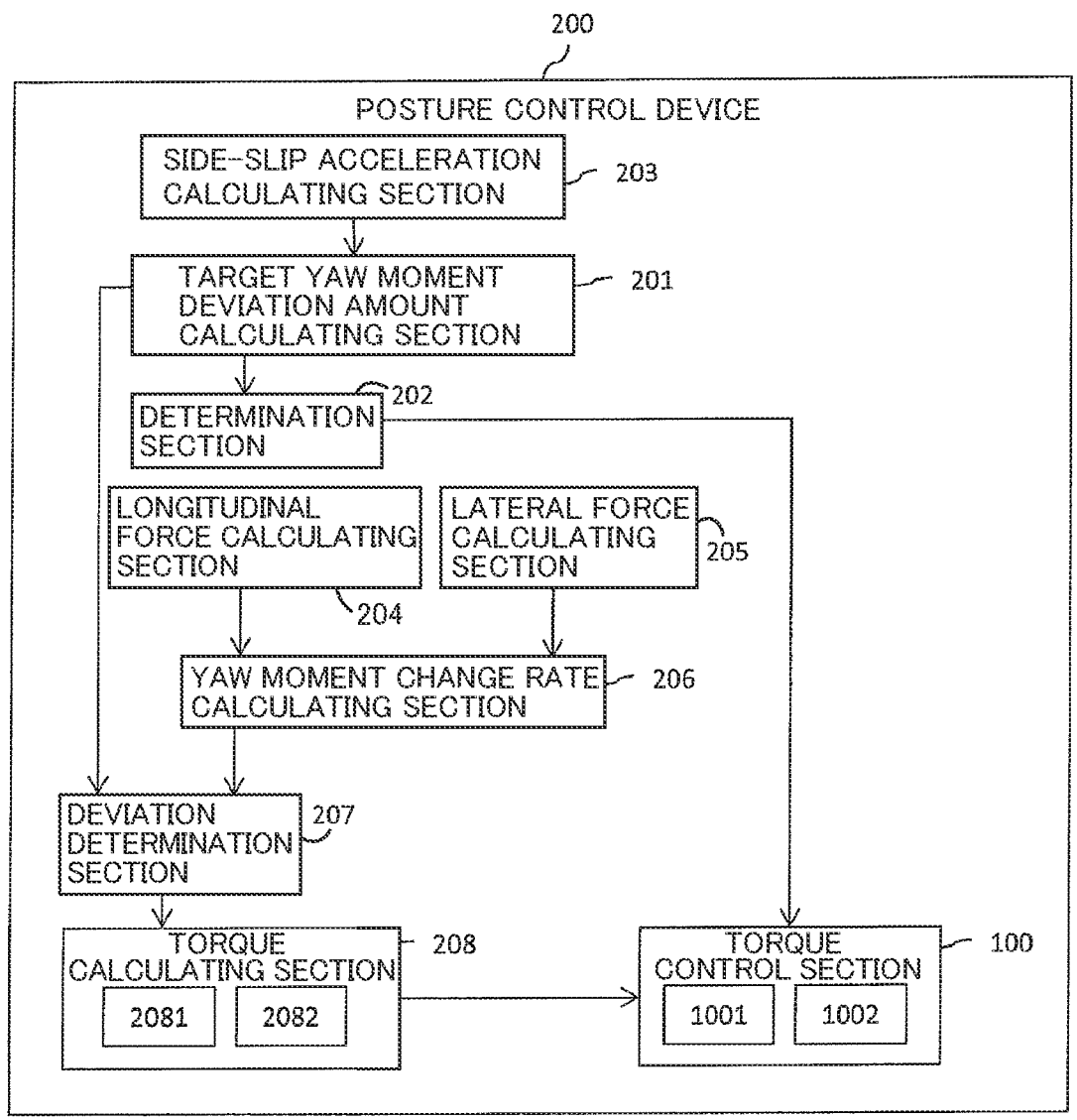
FIG. 12 is a functional block diagram of a configuration according to a first embodiment.
Figure 13:
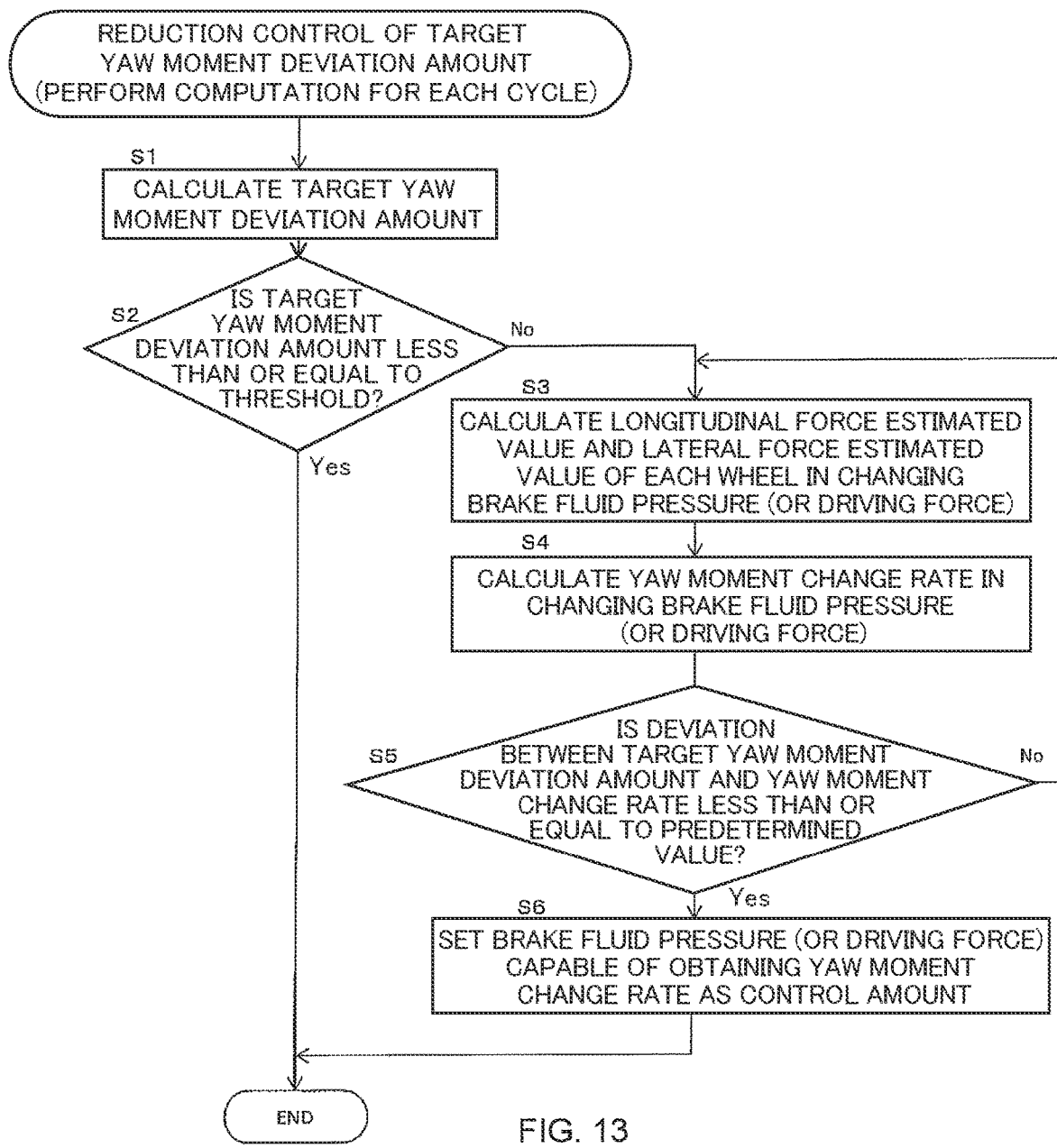
FIG. 13 is a control flowchart of reducing a yaw moment deviation amount.

FIG. 12 is a block diagram illustrated an example configuration of the posture control device 200. The posture control device 200 includes a target yaw moment deviation amount calculating section 201, a determination section 202, a side-slip acceleration calculating section 203, a longitudinal force calculating section 204, a lateral force calculating section 205, a yaw moment change rate calculating section 206, a deviation determination section 207, and a torque control section 100. FIG. 13 is a control flowchart of the posture control device 200.

First Embodiment

In the example shown in FIG. 13, a target yaw moment deviation amount is calculated (step S1). The target yaw moment deviation amount calculating section 201 calculates a target yaw moment deviation amount based on a side-slip acceleration of each wheel (a front wheel side-slip acceleration (dVf/dt), a rear wheel side-slip acceleration (dVr/dt)), a length lf from the vehicle center to the front wheel shaft, a length lr from the vehicle center to the rear wheel shaft, a load of each wheel (a front wheel static load mf, a rear wheel static load mr).

The "length from the vehicle center to the front wheel shaft," the "length form the vehicle center to the rear wheel shaft," and the "load in each wheel" are static values or dynamic values.

A dynamic length lfd from the vehicle center to the front wheel shaft, a dynamic length lrd from the vehicle center to the rear wheel shaft, a dynamic front wheel load mfd, and a dynamic rear wheel load mrd can be obtained as follows:
Gx: front and rear accelerations [m/s$^2$] (represented as "+" in acceleration, and "−" in deceleration)
lf: static length [m] from the vehicle center to the front wheel shaft
lr: static length [m] from the vehicle center to the rear wheel shaft
mf: static front wheel load [kg]
mr: static rear wheel load [kg]
Δmf: front wheel load change rate (the rate of change in a dynamic load with respect to a static load) [kg]
Δmr: rear wheel load change rate (the rate of change in a dynamic load with respect to a static load) [kg]
m: vehicle total weight [kg] (=mf+mr=mfd+mrd)
hgc: static barycenter height [m]
θ: roll angle (obtained by the roll angle detecting section 54)
g: gravitational acceleration [m/s$^2$]
l: wheel base (=lf+lr=lfd+lrd) [m]

The amount of movement of loads of the front and rear wheels with front and rear acceleration and deceleration are as follows: It should be noted that in the case of front left and right wheels, mf is the sum of the two wheels, whereas in the case of rear left and right wheels, mr is the sum of the two wheels.

$$\Delta m_f = -\frac{G_x}{g} \cdot \frac{h_{gc} \cdot \cos\theta}{l} \cdot m \quad \text{[Expression 2]}$$

$$\Delta m_r = \frac{G_x}{g} \cdot \frac{h_{gc} \cdot \cos\theta}{l} \cdot m$$

Accordingly, dynamic front and rear wheel loads are as follows:

$$mfd = mf + \Delta m_f$$

$$mrd = mr + \Delta m_r \quad \text{[Expression 3]}$$

By using these expressions, dynamic distances from the vehicle center to the front and rear wheels can be obtained as:

$$lfd = \frac{mrd}{m} \cdot l \quad \text{[Expression 4]}$$

$$lrd = \frac{mld}{m} \cdot l$$

The side-slip acceleration calculating section 203 calculates a front wheel side-slip acceleration and a rear wheel side-slip acceleration based on a yaw rate, a lean angle (θ) of the vehicle body, a lateral acceleration, and a vehicle body speed calculated by the vehicle speed detecting section 51.

The target yaw moment deviation amount calculating section 201 obtains a target yaw moment deviation amount using the expression below. In the expression, the upper equation represents a case where a target yaw moment deviation amount is obtained using a static value, and the lower equation represents a case where a target yaw moment deviation amount is obtained using a dynamic value.

$$\Delta I \frac{dr}{dt} = l_f \times \frac{dV_f}{dt} \times m_f - l_r \times \frac{dV_r}{dt} \times m_r \quad \text{[Expression 5]}$$

$$\Delta I \frac{dr}{dt} = l_{fd} \times \frac{dV_f}{dt} \times m_{fd} - l_{rd} \times \frac{dV_r}{dt} \times m_{rd}$$

where r (=dΨ/dt) is a yaw rate on a tire ground plane, Vf is a side-slip speed (integral value of a side-slip acceleration) of a front wheel speed, and Vr is a side-slip speed of a rear wheel speed, and ΔI is a yaw moment of inertia (inertia).

Next, it is determined whether the target yaw moment deviation amount is less than or equal to a threshold or not (step S2). The determination section 202 determines whether the target yaw moment deviation amount calculated by the target yaw moment deviation amount calculating section 201 is less than or equal to the threshold or not. If the target yaw moment deviation amount is less than or equal to the threshold, a current torque is maintained, and the torque is not modified.

If the target yaw moment deviation amount is not less than or equal to the threshold, steps S3 through S5 of an optimum solution search loop are performed. This will be described in detail below.

In step S3, a longitudinal force estimated value and a lateral force estimated value of each wheel when a brake fluid pressure or a driving force is changed is calculated.

The longitudinal force calculating section 204 calculates a longitudinal force estimated value in each wheel when the brake fluid pressure (or the driving force) in each wheel is changed. The longitudinal force calculating section 204 uses a value converted from the changed brake fluid pressure as a longitudinal force estimated value, for example. In the case of changing an engine torque (driving force), the longitudinal force calculating section 204 uses a value converted from the changed engine torque as the longitudinal force estimated value, for example.

The lateral force calculating section 205 calculates a lateral force estimated value in each wheel when the brake fluid pressure (or the driving force) in each wheel is changed. The lateral force calculating section 205 uses a value converted from the vehicle body roll angle (θ) as the lateral force estimated value, for example. A value of the brake fluid pressure or the engine torque to be changed is a predetermined value at the first time of the loop, and is caused to approach an optimum through repetition of loops.

In step S4, a yaw moment change rate obtained when the brake fluid pressure (or the driving force) is changed is calculated. The yaw moment change rate calculating section 206 calculates a yaw moment change rate about the vehicle center axis, based on the longitudinal force estimated value in each wheel calculated by the longitudinal force calculating section 204, the lateral force estimated value in each wheel calculated by the lateral force calculating section 205, a wheel base, and a tread width.

In step S5, it is determined whether a deviation between the target yaw moment deviation amount and the yaw moment change rate is less than or equal to a predetermined value or not. The deviation determination section 207 determines whether the deviation between the target yaw moment deviation amount calculated by the target yaw moment deviation amount calculating section 201 and the yaw moment change rate calculated by the yaw moment change rate calculating section 206 is less than or equal to a predetermined value or not.

If the deviation determination section 207 determines that the deviation is not less than or equal to the predetermined value, an optimum solution search loop in which the processes of the longitudinal force calculating section 204, the lateral force calculating section 205, the yaw moment change rate calculating section 206, and the deviation determination section 207 are repeated is executed.

In step S6, if the deviation between the target yaw moment deviation amount and the yaw moment change rate is less than or equal to the predetermined value, a brake fluid pressure (or a driving force) with which a yaw moment change rate can be obtained is used as a control rate. The torque control section 100 controls a torque (a braking force or a driving force) in each wheel, based on a longitudinal force of each wheel and a lateral force of each wheel with which the target yaw moment deviation amount is less than or equal to a threshold. The torque control section 100 controls the control elements so that a torque (a braking force or a driving force) is generated in accordance with these instructions.

If the deviation determination section 207 determines that the deviation is less than or equal to the predetermined value, a torque calculating section 208 calculates a torque (a braking force or a driving force) in each wheel that can obtain a yaw moment change rate. For example, the torque calculating section 208 may include a brake fluid pressure calculating section 2081 that calculates a brake fluid pressure in each wheel that can obtain a yaw moment change rate. The torque control section 100 may include a brake fluid pressure control section 1001 that controls a brake fluid pressure in the fluid pressure controlling unit 102, based on the brake fluid pressure calculated by the brake fluid pressure calculating section 2081.

The torque calculating section 208 may include a driving force calculating section 2082 that calculates a driving force in each wheel that can obtain a yaw moment change rate. The torque control section 100 may include a driving force controlling section 1002 that controls a driving force based on the driving force calculated by the driving force calculating section 2082.

As the optimum solution search loop, the following loop process may be performed.

Imon: yaw moment estimated value
ΔImon: yaw moment change rate
Fx: longitudinal force estimated value [N] ( represents each wheel, first * represents front [f] or rear [r], and next * represents left [l] or right [r]. e.g., Fxfl is a longitudinal force estimated value of the left front wheel, Fxfr is a longitudinal force estimated value of the right front wheel, Fxrl is a longitudinal force estimated value of the left rear wheel, and Fxrr is a longitudinal force estimated value of the right rear wheel.)

Fy: lateral force estimated value [N] ( represents each wheel, first * represents front [f] or rear [r], and next * represents left [l] or right [r]. e.g., a Fyfl is a lateral force estimated value of the left front wheel, Fyfr is a lateral force estimated value of the right front wheel, Fyrl is a lateral force estimated value of the left rear wheel, and Fyrr is a lateral force estimated value of the right rear wheel.)

Itarget: target yaw moment deviation amount (also represented as $\Delta I \cdot dr/dt$)

df: tread width [m] of the front left and right wheels dr: tread width [m] of the rear left and right wheels A yaw moment estimated value Imon at a loop start (first loop or start of repetition) can be calculated using a longitudinal force estimated value and a lateral force estimated value of each wheel as follows:

$$I_{mon} = l_f(F_{yfl} + F_{yfr}) - l_r(F_{yrl} + F_{yrr}) + \qquad \text{[Expression 6]}$$
$$\frac{d_f}{2}(F_{xfr} - F_{xfl}) + \frac{d_r}{2}(F_{xrr} - F_{xrl})$$

For example, when a braking force of the front left wheel is changed, the longitudinal force estimated value and the lateral force estimated value are as follows: In the braking force change rate here, the rate at the first loop is an arbitrary value.

(Loop: S1)

A longitudinal force change rate is Fxfl+ΔFxfl.

A lateral force change rate is Fyfl. In this example, suppose the tires are in a linear range, a lateral force does not change even with a change in a longitudinal force. On the other hand, in a tire non-linear range such as during ABS control, a lateral force may change with a change in a longitudinal force in accordance with μ-s characteristics.

A yaw moment change rate Almon in this case is as follows:

(Loop: S2)

$$I_{mon} + \Delta I_{mon} = l_f(F_{yfl} + F_{yfr}) - l_r(F_{yrl} + F_{yrr}) + \qquad \text{[Expression 7]}$$
$$\frac{d_f}{2}(F_{xfr} - (F_{xfl} + \Delta F_{xfl})) + \frac{d_r}{2}(F_{xrr} - F_{xrl})$$
$$\Delta I_{mon} = -\frac{d_r}{2}(\Delta F_{xfl})$$

(Loop: S3)

Thereafter, in S3, the yaw moment change rate Almon and the target yaw moment deviation amount Itarget are compared. As a result of comparison, if the deviation does not satisfy the condition that the deviation is less than or equal to the predetermined value, the process returns to loop: S1.

In returning to loop: S1 (second time or later), a gradient of a deviation between Itarget and ΔImon is calculated. The deviation gradient is a difference between the current loop result (deviation between Itarget and ΔImon) and a previous loop result (in the first loop, a deviation gradient is not calculated).

The evaluation of the deviation gradient shows that the deviation is increasing, a change direction (increase or decrease) of a braking force of the front left wheel in the next loop is reversed from the direction in the current loop. On the other hand, the evaluation of the deviation gradient shows that the deviation is decreasing, the change direction of a braking force of the front left wheel is set at the same direction as the direction in the current loop. The degree of a braking force in the next loop is determined based on the value of deviation between Itarget and ΔImon in the current loop and the deviation gradient. Subsequent loops are repeated using the thus-obtained change rate of a braking force of the front left wheel.

The foregoing direction is directed to the example of a braking force change in the front left wheel, and a loop process is sequentially performed for the other wheels. For example, the loop process may be performed in the order of the front left wheel, the front right wheel, and the rear wheel. The loop process for each wheel may be performed multiple times, and may continue until the deviation between Itarget and ΔImon reaches the predetermined value or less.

In this embodiment, the following posture control can be performed.

(1) In turning, a vehicle behavior in turning can be controlled by reducing the absolute value of a longitudinal force in a wheel. For example, an inward-steering moment of the handlebar by front wheel braking is canceled by an outward-steering moment by a difference between braking forces in the front left and right wheels. That is, a steering moment against a steering moment due to the tire shape of the leaning vehicle is generated.

(2) In turning, a vehicle behavior in turning can be controlled by increasing the absolute value of a longitudinal force in a wheel. For example, in the absence of a braking operation, a yaw moment is reduced by front wheel braking at generation of a yaw moment by rear wheel side-slip.

Second Embodiment

A second embodiment includes the configuration of the first embodiment and is directed to torque control in anti-lock control.

The longitudinal force calculating section 204 calculates a longitudinal force estimated value by conversion from a brake fluid pressure at a change in a slip ratio and the slip ratio during anti-lock control. The lateral force calculating section 205 calculates a lateral force estimated value by conversion from a vehicle body roll angle (θ) and a slip ratio during anti-lock control. An optimum solution search loop using the thus-obtained longitudinal force estimated value and lateral force estimated value is performed so that an anti-lock operation of each of the front wheels and the rear wheel can be corrected.

In this embodiment, the following posture control can be performed.

(1) In turning, a target slip during anti-lock control is changed so that a vehicle behavior in turning can be controlled. For example, while the vehicle body leans because of drift-out, lateral forces of the front wheels are restored and a steering yaw moment is created by changing the slip ratio during anti-lock control. On generation of a yaw moment at spinning, a lateral force of the rear wheel is restored and a yaw moment is reduced by changing the slip ratio during anti-lock control.

(2) In straight-ahead traveling (where the road surface μ is different between the left and right wheels), a target slip during anti-lock control is changed so that a vehicle behavior in straight-ahead traveling can be controlled. For example, against a vehicle body moment with a braking force difference among the wheels, braking forces in the wheels are adjusted so as to obtain an optimum vehicle body yaw state (traveling direction).

Third Embodiment

A third embodiment includes the configuration of the first or second embodiment and is directed to control of suppression of a tilt motion.

The posture control device 200 further includes a suppression section (not shown) that suppresses a tilt motion occurring when the torque control section 100 controls a torque (a braking force or a driving force) in each wheel. The suppression section issues instructions to the tilt mechanism section of the vehicle 1 and suppresses a tilt motion.

The tilt mechanism section of the vehicle 1 includes a suppression mechanism for suppressing a tilt motion. Examples the suppression mechanism include a damper that can be electronically controlled, and the damper can suppress a tilt motion by reducing a rotational speed of a linkage mechanism. The tilt motion is suppressed in accordance with instructions from the suppression section of the posture control device 200.

OTHER EMBODIMENTS

As another embodiment, the longitudinal force calculating section may estimate a longitudinal force based on a detection value of a throttle sensor and a detection value (brake pressure) of a brake modulator. The lateral force calculating section may calculate a lateral force Ftotal using the equation below, where θ is a roll angle, θ" is a roll angle acceleration, h is a distance between a barycenter point and an intersection point, Ay is a ground position lateral acceleration, and Ftotal is a lateral force.

$$F\text{total} = m \cdot Ay + m \cdot h \cdot \theta'' / \cos \theta$$

The ground position lateral acceleration Ay may be calculated based on a lateral acceleration, a roll angle acceleration, a yaw angle acceleration, a roll angle, and a barycenter point of the vehicle.

As another embodiment, the brake fluid pressure control section may perform control concerning opening and closing operations of the retention valve and the pressure reducing valve, and control concerning a driving stop operation of the pump. With this configuration, a braking force of each wheel can be changed so that a posture of the vehicle can be controlled by controlling a brake fluid pressure in each wheel.

As another embodiment, in a case where the torque control section 100 controls a driving force in each wheel, a wheel-in motor is disposed in at least the front wheels (the front right wheel and the front left wheel), and the torque control section 100 may control the wheel-in motor.

As described in the embodiment described above, in a multi-wheel leaning vehicle in which one of the front wheel and the rear wheel includes left and right wheels, a braking torque or a driving torque of each of the front left and right wheels and the rear wheel is controlled, for example. The multi-wheel leaning vehicle travels with the front left and right wheels thereby being traveling on road surfaces having different friction coefficients (including straight-ahead traveling and curve traveling) in some cases. Control is also needed for the posture of the vehicle traveling on such road surfaces in some cases.

Figure 14:
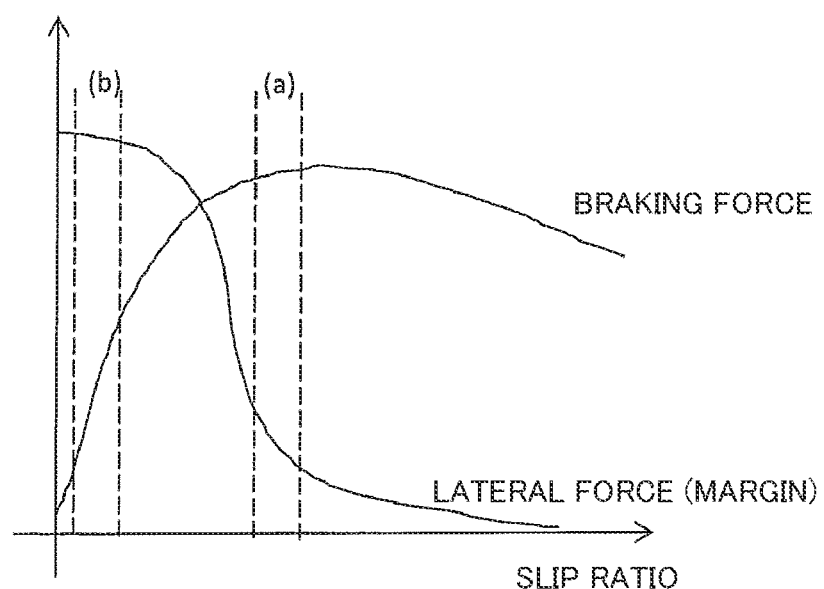
FIG. 14 is a graph showing a relationship among a slip ratio, a braking force, and a lateral force.

An anti-lock brake system (ABS) monitors a slip ratio of a vehicle and controls a brake fluid pressure when the slip ratio is before a saturation point of a braking force (in a state where a lateral force is low) (region (a) in FIG. 14). When the ABS is actuated while the vehicle is turning with the body frame leaned in the left direction or in the right direction, the posture of the vehicle is controlled by the remaining lateral direction. As the lean of the body frame during turning of the vehicle increases, a lateral force necessary for posture control increases. Thus, in a case where the ABS is actuated while the vehicle is turning with a large lean (in a state where the lateral force is small), the posture of the vehicle needs to be controlled in some cases. For example, in region (b) in FIG. 14, a lateral force necessary for posture control is obtained.

In this embodiment, in consideration of the foregoing circumstances, in the leaning vehicle in which one of the front wheel and the rear wheel includes left and right wheels, a posture control device for controlling the posture of the vehicle in straight traveling or turning traveling is provided.

Figure 17:
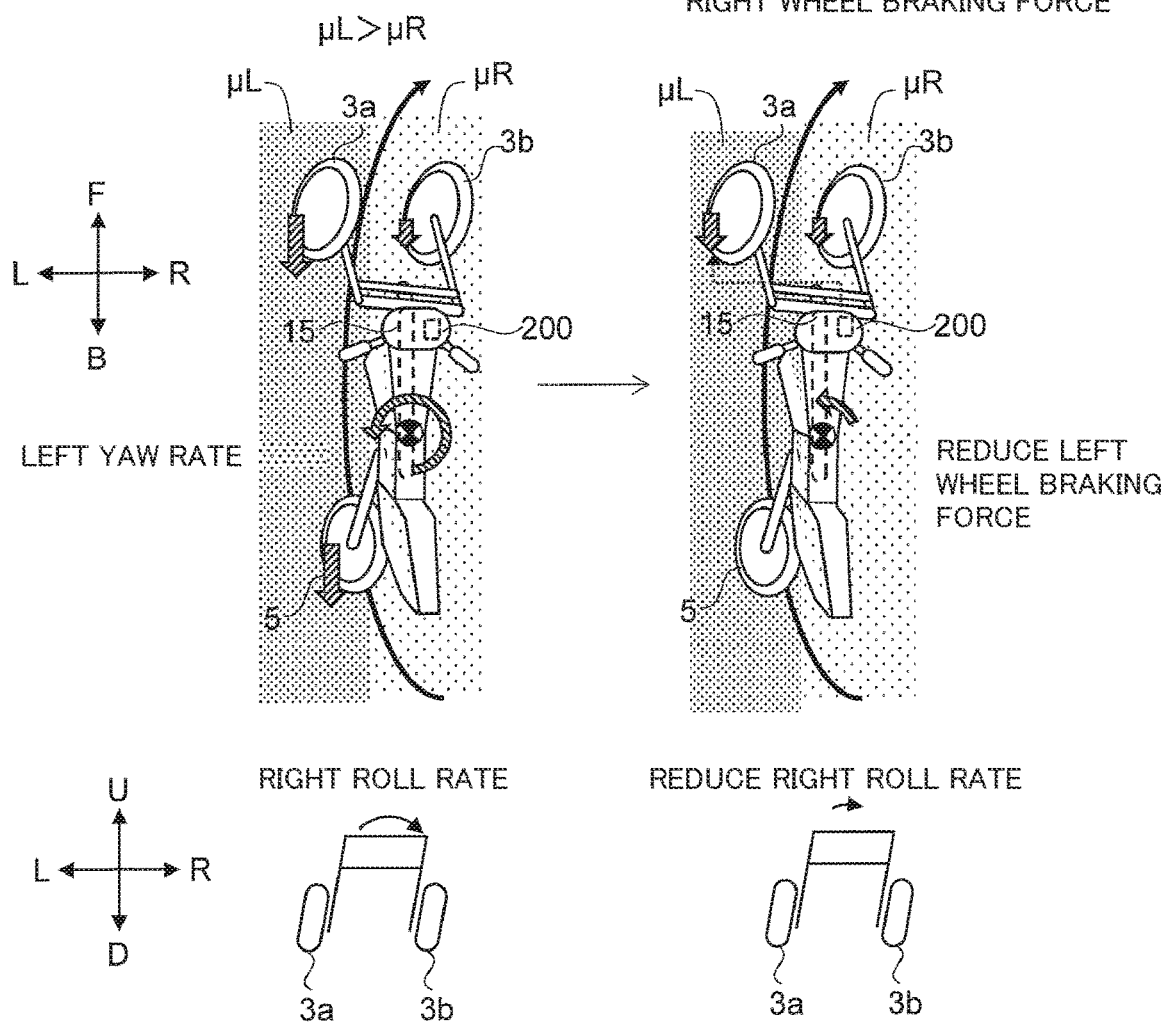
FIG. 17 shows illustrations for describing an example of motion of the vehicle in the embodiment.

FIG. 17 is a view for describing an example motion of the left-right-wheel-equipped leaning vehicle in a case where a friction coefficient (μL) between the left inclined wheel and the road surface and a friction coefficient (μR) between the right inclined wheel and the road surface are different from each other during turning. In the example illustrated in FIG. 17, in the vehicle turning rightward, the friction coefficient (μL) between the left front wheel 3a and the road surface is larger than the friction coefficient (μR) between the right front wheel 3b and the road surface (μR>μL). In this case, a braking force of the left front wheel 3a is larger than a braking force of the right front wheel 3b. That is, a longitudinal force of the left front wheel 3a is different from a longitudinal force of the right front wheel 3b. Accordingly, a leftward yaw moment (yaw rate) is generated in the body frame 15. Thus, the turning radius increases, and a centrifugal force decreases. Consequently, a roll moment (roll rate) of leaning the body frame 15 rightward, that is, to the inner side of turning, is generated. In this case, the posture control device 200 reduces a braking force of the left front wheel 3a. Accordingly, a difference between longitudinal forces of the left front wheel 3a and the right front wheel 3b can be reduced. As a result, the leftward yaw moment is reduced, and a roll moment of leaning the body frame 15 rightward is also reduced. In this manner, the process in which the posture control device 200 reduces a braking force of the left front wheel 3a can be achieved by calculating a brake fluid pressure of the left front wheel 3a based on target yaw moment deviation amount in the embodiment, for example.

Figure 18:
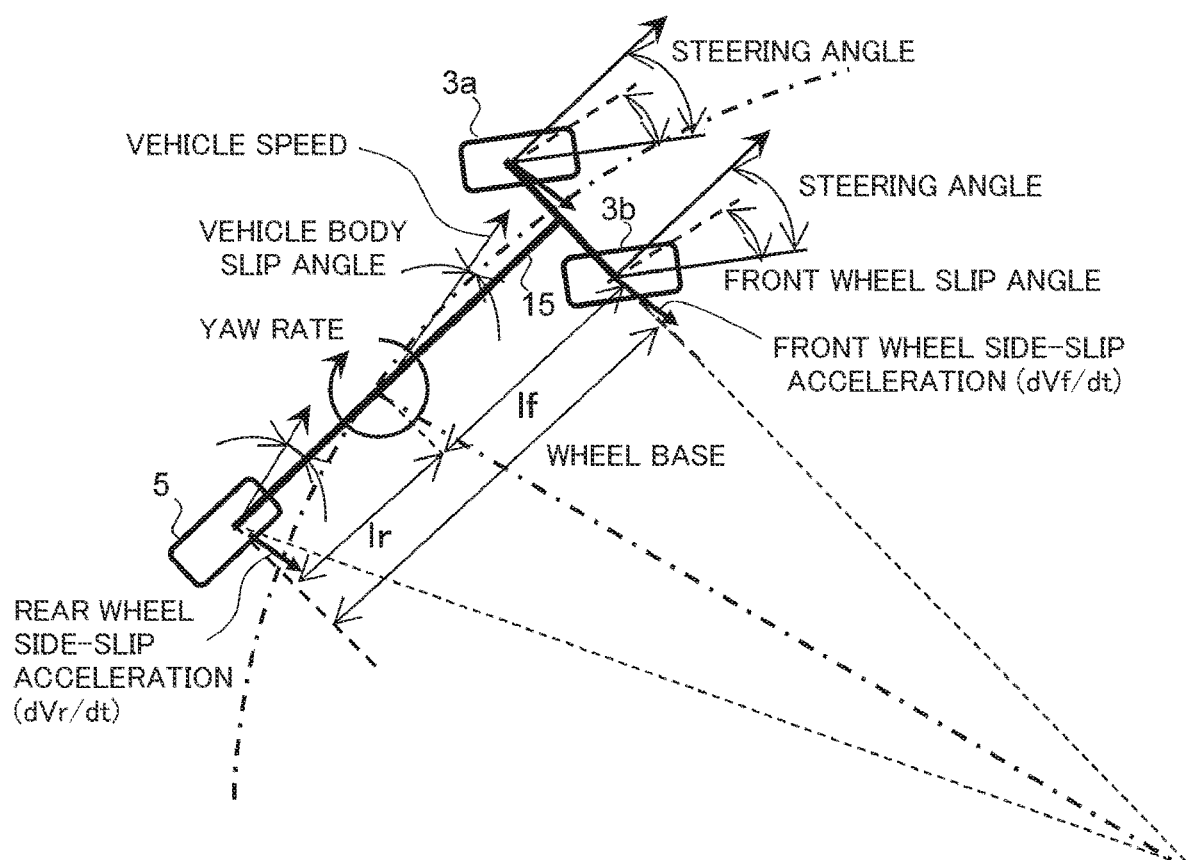
FIG. 18 is an illustration for describing values in calculating a target yaw moment deviation amount.

FIG. 18 is a view for describing values in calculating a target yaw moment deviation amount in the embodiment. The inventor focused on a phenomenon that in a case where the left-right-wheel-equipped leaning vehicle turns with the left inclined wheel, the right inclined wheel, and the other inclined wheel sufficiently gripping a road surface, the yaw rate and the roll rate of the body frame are substantially uniquely defined relative to each other. By using this phenomenon, in this embodiment, the side-slip acceleration calculating section 203 calculates side-slip accelerations of the left front wheel 3a and the right front wheel 3b and a side-slip acceleration of the rear wheel 5, using a yaw rate of the body frame 15 detected by the gyro sensor 53, a lean angle (roll angle) of the body frame 15 detected by the lean detecting section 50, and a lateral acceleration detected by the lateral acceleration sensor. The lateral acceleration is an acceleration in the left direction of the body frame or in the right direction of the body frame.

For example, the side-slip acceleration calculating section 203 calculates a side-slip acceleration occurring in each wheel, based on an input vehicle body speed V, a roll angle θ of the body frame 15, a yaw rate, and a lateral acceleration. The side-slip acceleration is calculated by the expression below, as an example. In the expression, dVf/dt is a side-slip acceleration occurring in the front wheels (the left front wheel and the right front wheel in the example described above), dVr/dt is a side-slip acceleration occurring in the rear wheel 5, and Ay is a detection value of the lateral acceleration sensor attached to the body frame. In addition, Iaf is a horizontal distance between an attachment position of the lateral acceleration sensor and a midpoint of a line connecting the centers of the left front wheel and the right front wheel, Iar is a horizontal distance between an attachment position of the lateral acceleration sensor and the center of the rear wheel, and w is a yaw rate detected by the gyro sensor 53.

$$dVf/dt=-V\cdot\omega\cdot\sec\theta-g\cdot\tan\theta+Ay\cdot\sec\theta+Iaf\cdot d\omega/dt\cdot\sec\theta$$

$$dVr/dt=-V\cdot\omega\cdot\sec\theta-g\cdot\tan\theta+Ay\cdot\sec\theta-Iar\cdot d\omega/dt\cdot\sec\theta$$

In the case of calculating a side-slip acceleration with detection of a roll rate, the calculation is performed based on the equation below, where wr is a detection value of the roll rate.

$$dVf/dt=-V\cdot\omega\cdot\sec\theta-g\cdot\tan\theta+Ay\cdot\sec\theta+Iaf\cdot d\omega/dt\cdot\sec\theta+Iaf\cdot wr\cdot\omega\cdot\tan\theta\cdot\sec\theta$$

$$dVr/dt=-V\cdot\omega\cdot\sec\theta-g\cdot\tan\theta+Ay\cdot\sec\theta-Iar\cdot d\omega/dt\cdot\sec\theta-Iar\cdot wr\cdot\omega\cdot\tan\theta\cdot\sec\theta$$

Accordingly, a change in a yaw rate due to a decrease of gripping of the left inclined wheel, the right inclined wheel, and the other inclined wheel on the road surface is reflected on side-slip accelerations (dVr/dt) of the left front wheel 3a and the right front wheel 3b and a side-slip acceleration (dVf/dt) of the rear wheel 5 calculated by the side-slip acceleration calculating section 203 in this embodiment. Using the side-slip accelerations (dVr/dt) and (dVf/dt), a target yaw moment deviation amount is calculated. In this case, the target yaw moment deviation amount may also be regarded as a value indicating a change rate in a yaw moment due to side-slip of the left inclined wheel, the right inclined wheel, and the other inclined wheel. That is, the yaw moment deviation amount in this embodiment is an example of a physical quantity concerning side-slip of the left inclined wheel, the right inclined wheel, and the other inclined wheel.

In this embodiment, an operation in which the torque calculating section and the torque control section control torques of the left front wheel 3a and the right front wheel 3b so as to reduce the target yaw moment deviation amount is an example of an operation in which the leaning posture control device controls a torque of at least one of the right inclined wheel or the left inclined wheel so as to reduce a change in a lean of the body frame 15 in the left direction or in the right direction.

The physical quantity concerning side-slip of the left inclined wheel, the right inclined wheel, and the other inclined wheel is not limited to the above example. Side-slip of a wheel is a phenomenon in which the wheel is displaced in the left direction of the vehicle or in the right direction of the vehicle with respect to a road surface. When a force in the left direction of the vehicle or in the right direction of the vehicle is exerted on a wheel while the wheel does not completely grip the road surface, side-slip of the wheel occurs. The physical quantity concerning side-slip of the left inclined wheel, the right inclined wheel, and the other inclined wheel may be a value obtained by detecting a displacement, a speed, or an acceleration of the wheels that actually occurs, and an estimated value of such a displacement, a speed, or an acceleration. The physical quantity concerning side-slip is not limited to a specific value, and may be, for example, a displacement, a speed, an acceleration, an angular velocity, or an angular acceleration, or a value expressed using at least two of these parameters. A method for calculating a physical quantity concerning side-slip of the left inclined wheel, the right inclined wheel, and the other inclined wheel is not limited to the method of the embodiment. For example, a physical quantity concerning side-slip can be acquired by measuring movements of the left inclined wheel, the right inclined wheel, and the other inclined wheel on the road surface with a ground speed meter. In this case, the left-right-wheel-equipped leaning vehicle is configured to include a ground speed meter that directly measures a physical quantity concerning side-slip.

In this embodiment, a longitudinal force is the sum of forces exerted on the wheels in the forward direction of the vehicle or in the rearward direction of the vehicle. A lateral force is the sum of forces exerted on the wheels in the left direction of the vehicle or in the right direction of the vehicle. A lateral acceleration is an acceleration in the left direction of the vehicle or in the right direction of the vehicle. The case of simply referring to a lateral acceleration means an acceleration of the body frame in the left direction of the vehicle or in the right direction of the vehicle.

The leaning posture control device may control a torque of at least one of the left inclined wheel or the right inclined wheel based on a physical quantity concerning side-slip of the left inclined wheel, the right inclined wheel, and the other inclined wheel, irrespective of an operation of braking or driving the left inclined wheel, the right inclined wheel, or the other inclined wheel by a rider. Accordingly, irrespective of a rider's operation, posture control can be performed in accordance with side-slip of the left inclined wheel, the right inclined wheel, and the other inclined wheel. For example, while the rider does not perform an operation of braking or driving the left inclined wheel, the right inclined wheel, or the other inclined wheel, the leaning posture control device performs control of making a braking force or a driving force different between the left inclined wheel and the right inclined wheel.

Alternatively, with an input of an operation of braking or driving the left inclined wheel, the right inclined wheel, or the other inclined wheel by the rider, the leaning posture control device may control a torque of at least one of the left inclined wheel or the right inclined wheel based on a physical quantity concerning side-slip of the left inclined wheel, the right inclined wheel, and the other inclined wheel, in addition to the rider's operation.

The configuration with which the leaning posture control device controls a torque of at least one of the right inclined wheel or the left inclined wheel based on a physical quantity concerning side-slip of the right inclined wheel, the left inclined wheel, and the other inclined wheel so as to reduce a change in a lean of the lean body frame in the left direction or in the right direction while the lean body frame leans in the left direction or in the right direction is not limited to the configuration of the torque calculating section and the torque control section according to this embodiment. In the above example, the leaning posture control device calculates a braking force or a driving force of the right inclined wheel and a braking force or a driving force of the left inclined wheel that reduce a target yaw rate deviation amount calculated based on side-slip of the right inclined wheel, the left inclined wheel, and the other inclined wheel.

As another variation, the leaning posture control device may previously record corresponding data indicating control values corresponding to a plurality of combinations concerning side-slip of the right inclined wheel, the left inclined wheel, and the other inclined wheel. In this case, the leaning posture control device can determine control values corresponding to detected or estimated values concerning side-slip of the right inclined wheel, the left inclined wheel, and the other inclined wheel with reference to the corresponding data. The control value can be, for example, a value indicating a braking force or a driving force of at least one of the right inclined wheel or the left inclined wheel. The format of the corresponding data is not limited to a specific format, and may be formats such as map data and table data. Alternatively, instead of the corresponding data, the leaning posture control device may use a predetermined equation to determine a control value. For example, detected or estimated values concerning side-slip of the right inclined wheel, the left inclined wheel, and the other inclined wheel may be substituted into a predetermined equation to calculate a control value.

The embodiment is an example in which the left inclined wheel and the right inclined wheel are front wheels and the other inclined wheel is the rear wheel. The present teaching is also applicable to a left-right-wheel-equipped leaning vehicle in which a left inclined wheel and a right inclined wheel are rear wheels and another inclined wheel is a front wheel. Each of the front wheel and the rear wheel may be constituted by a pair of left and right inclined wheels.

The lean detecting section 50 is not limited to the configuration described above. The lean detecting section 50 may be configured to estimate a roll angle by using at least one of a six-axis acceleration or a six-axis speed detected in the vehicle. The lean detecting section 50 may be configured to measure a physical quantity concerning a roll angle of the body frame. The lean detecting section 50 may include a sensor for detecting relative rotation of the body frame and the linkage mechanism, such as a potentiometer. Alternatively, the lean detection section 50 may include a proximity sensor (distance sensor). In this case, the proximity sensor may measure a distance between the body frame and the road surface to estimate a roll angle based on the distance. The left-right-wheel-equipped leaning vehicle and the leaning posture control device for the leaning vehicle according to the present teaching do not necessarily include a lean detecting section.

The configuration of the linkage mechanism 9 is not limited to a parallelogram linkage. The linkage mechanism 9 may include a shock tower as an arm that rotates with respect to the body frame, for example. The linkage mechanism 9 may be configured to include a double wishbone frame structure. The linkage mechanism 9 may be configured to include a left arm and a right arm that are arranged in the left-right direction and rotatably attached to the body frame. In this case, the left arm supports the left steering wheel in such a manner that the left steering wheel is movable in the top-bottom direction relative to the body frame, and the right arm supports the right steering wheel in such a manner that the right steering wheel is movable in the top-bottom direction relative to the body frame.

The linkage mechanism 9 may include an actuator that applies, to the body frame, a force for rotating the arms. In this manner, a lean of the body frame in the left direction or in the right direction can be controlled by the actuator. In this case, control of the roll moment of the body frame by the leaning posture control device and control of the roll moment by the actuator of the linkage mechanism are combined.

The body frame is a member that receives stress on the leaning vehicle during traveling. Examples of the body frame include a monocoque (stressed-skin structure), a semi-monocoque, and a structure in which a vehicle part also serves as a member that receives stress. For example, a part such as an engine or an air cleaner may be a part of the body frame.

In the case of controlling driving forces of the left inclined wheel and the right inclined wheel, a driving source such as an electric motor or an engine for driving the left inclined wheel and the right inclined wheel may be provided in the left-right-wheel-equipped leaning vehicle, for example. In the case of the engine, torques of the left inclined wheel and the right inclined wheel can be detected or controlled using the amounts of air and fuel supplied to the engine, a load of the engine, the revolution speed of the engine, and so forth. In the case of the electric motor, torques of the left inclined wheel and the right inclined wheel can be detected or controlled using a current, a voltage, a command value, and so forth supplied to the electric motor.

A configuration for controlling braking forces of the left inclined wheel and the right inclined wheel may be the configuration for controlling a brake described above, and a configuration of supplying a braking force by regeneration or reverse driving of an electric motor connected to the left inclined wheel and the right inclined wheel, for example.

REFERENCE SIGNS LIST

100 torque control section
200 posture control section
201 target yaw moment deviation amount calculating section
202 determination section
203 side-slip acceleration calculating section
204 longitudinal force calculating section
205 lateral force calculating section
206 yaw moment change rate calculating section
207 deviation determination section
208 torque calculating section

What is claimed is:

1. A leaning posture control device for a left-right-inclined-wheel-equipped leaning vehicle, the leaning posture control device being configured to control a leaning posture of the leaning vehicle, and the leaning vehicle including:
    a lean body frame that leans leftward when the vehicle is turning leftward in a left-right direction of the vehicle, and leans rightward when the vehicle is turning rightward in the left-right direction of the vehicle;
    a right inclined wheel supported on the lean body frame, the right inclined wheel being leaned leftward when the vehicle is turning leftward in the left-right direction of the vehicle and being leaned rightward when the vehicle is turning rightward in the left-right direction of the vehicle;
    a left inclined wheel supported on the lean body frame and disposed at a side of the right inclined wheel in the left-right direction of the vehicle, the left inclined wheel being leaned leftward when the vehicle is turning leftward in the left-right direction of the vehicle and being leaned rightward when the vehicle is turning rightward in the left-right direction of the vehicle; and
    another inclined wheel supported on the lean body frame and disposed ahead of or behind the right inclined wheel and the left inclined wheel in a front-rear direction of the vehicle, the other inclined wheel being leaned leftward when the vehicle is turning leftward in the left-right direction of the vehicle and being leaned rightward when the vehicle is turning rightward in the left-right direction of the vehicle, wherein the leaning posture control device controls a torque of at least one of the right inclined wheel or the left inclined wheel arranged in the left-right direction of the vehicle so as to suppress a change in a lean of the lean body frame in a left direction of the vehicle while the lean body frame is leaned in the left direction by side-slip, in the left direction of the vehicle or in the right direction of the vehicle, of the right inclined wheel and the left inclined wheel, and the other inclined wheel or a change in a lean of the lean body frame in a right direction of the vehicle while the lean body frame is leaned in the right direction by the side-slip, in the left direction of the vehicle or in the right direction of the vehicle, of the right inclined wheel and the left inclined wheel, and the other inclined wheel, based on a physical quantity concerning the side-slip, in the left direction of the vehicle or in the right direction of the vehicle, of the right inclined wheel, the left inclined wheel, and the other inclined wheel disposed ahead of or behind the right inclined wheel and the left inclined wheel in the front-rear direction of the vehicle.

2. The leaning posture control device according to claim 1, wherein the leaning posture control device controls a torque of at least one of the right inclined wheel or the left inclined wheel so as to suppress the change in the lean of the lean body frame in the left direction while the lean body frame is leaned in the left direction or the change in the lean of the lean body frame in the right direction of the vehicle while the lean body frame is leaned in the right direction, based on the physical quantity concerning side-slip of the right inclined wheel, the left inclined wheel, and the other inclined wheel.

3. The leaning posture control device according to claim 2, wherein the physical quantity concerning side-slip of the right inclined wheel, the left inclined wheel, and the other inclined wheel is a physical quantity concerning displacement of a ground-contact point of each of the right inclined wheel, the left inclined wheel, and the other inclined wheel in the left direction of the vehicle or in the right direction of the vehicle.

4. A left-right-inclined-wheel-equipped leaning vehicle comprising the leaning posture control device according to claim 2, wherein the left inclined wheel and the right inclined wheel are front wheels, and the other inclined wheel is a rear wheel, and the leaning posture control device makes a braking torque of one of the left inclined wheel and the right inclined wheel at an outer side of turning larger than a braking torque of one of the left inclined wheel and the right inclined wheel at an inner side of turning in a case where the lean body frame is leaned in the left direction or in the right direction and side-slip occurs in the other inclined wheel while the vehicle is turning, and makes the braking torque of the one of the left inclined wheel and the right inclined wheel at the outer side of turning smaller than the braking torque of the one of the left inclined wheel and the right inclined wheel at the inner side of turning in a case where the lean body frame is leaned in the left direction or in the right direction and side-slip occurs in the left inclined wheel and the right inclined wheel while the vehicle is turning.

5. The leaning posture control device according to claim 1, wherein the physical quantity concerning side-slip of the right inclined wheel, the left inclined wheel, and the other inclined wheel is a physical quantity concerning displacement of a ground-contact point of each of the right inclined wheel, the left inclined wheel, and the other inclined wheel in the left direction of the vehicle or in the right direction of the vehicle.

6. The leaning posture control device according to claim 5, wherein the physical quantity concerning displacement of the ground-contact point of each of the right inclined wheel, the left inclined wheel, and the other inclined wheel in the left direction or in the right direction is a displacement, a speed, an acceleration, an angular velocity, an angular acceleration, or a value expressed by using at least two of the displacement, the speed, the acceleration, the angular velocity, or the angular acceleration.

7. A left-right-inclined-wheel-equipped leaning vehicle comprising the leaning posture control device according to claim 6, wherein the left inclined wheel and the right inclined wheel are front wheels, and the other inclined wheel is a rear wheel, and the leaning posture control device makes a braking torque of one of the left inclined wheel and the right inclined wheel at an outer side of turning larger than a braking torque of one of the left inclined wheel and the right inclined wheel at an inner side of turning in a case where the lean body frame is leaned in the left direction or in the right direction and side-slip occurs in the other inclined wheel while the vehicle is turning, and makes the braking torque of the one of the left inclined wheel and the right inclined wheel at the outer side of turning smaller than the braking torque of the one of the left inclined wheel and the right inclined wheel at the inner side of turning in a case where the lean body frame is leaned in the left direction or in the right direction and side-slip occurs in the left inclined wheel and the right inclined wheel while the vehicle is turning.

8. A left-right-inclined-wheel-equipped leaning vehicle comprising the leaning posture control device according to claim 5, wherein the left inclined wheel and the right inclined wheel are front wheels, and the other inclined wheel is a rear wheel, and the leaning posture control device makes a braking torque of one of the left inclined wheel and the right inclined wheel at an outer side of turning larger than a braking torque of one of the left inclined wheel and the right inclined wheel at an inner side of turning in a case where the lean body frame is leaned in the left direction or in the right direction and side-slip occurs in the other inclined wheel while the vehicle is turning, and makes the braking torque of the one of the left inclined wheel and the right inclined wheel at the outer side of turning smaller than the braking torque of the one of the left inclined wheel and the right inclined wheel at the inner side of turning in a case where the lean body frame is leaned in the left direction or in the right direction and side-slip occurs in the left inclined wheel and the right inclined wheel while the vehicle is turning.

9. A left-right-inclined-wheel-equipped leaning vehicle comprising the leaning posture control device according to claim 1, wherein
the left inclined wheel and the right inclined wheel are front wheels, and the other inclined wheel is a rear wheel, and
the leaning posture control device
makes a braking torque of one of the left inclined wheel and the right inclined wheel at an outer side of turning larger than a braking torque of one of the left inclined wheel and the right inclined wheel at an inner side of turning in a case where the lean body frame is leaned in the left direction or in the right direction and side-slip occurs in the other inclined wheel while the vehicle is turning, and
makes the braking torque of the one of the left inclined wheel and the right inclined wheel at the outer side of turning smaller than the braking torque of the one of the left inclined wheel and the right inclined wheel at the inner side of turning in a case where the lean body frame is leaned in the left direction or in the right direction and side-slip occurs in the left inclined wheel and the right inclined wheel while the vehicle is turning.

* * * * *